(12) United States Patent
Toyota et al.

(10) Patent No.: US 10,658,639 B2
(45) Date of Patent: May 19, 2020

(54) METHOD OF PREPARING MICROPOROUS MEMBRANE, MICROPOROUS MEMBRANE, BATTERY SEPARATOR, AND SECONDARY BATTERY

(71) Applicant: Toray Industries, Inc., Tokyo (JP)

(72) Inventors: Naoki Toyota, Nasushiobara (JP); Mayumi Yoshida, Nasushiobara (JP)

(73) Assignee: Toray Industries, Inc., Tokyo (JP)

( * ) Notice: Subject to any disclaimer, the term of this patent is extended or adjusted under 35 U.S.C. 154(b) by 166 days.

(21) Appl. No.: 15/579,306

(22) PCT Filed: Jun. 1, 2016

(86) PCT No.: PCT/JP2016/066224
§ 371 (c)(1),
(2) Date: Dec. 4, 2017

(87) PCT Pub. No.: WO2016/194962
PCT Pub. Date: Dec. 8, 2016

(65) Prior Publication Data
US 2018/0166670 A1    Jun. 14, 2018

(30) Foreign Application Priority Data
Jun. 5, 2015   (JP) ................................ 2015-115327

(51) Int. Cl.
*H01M 2/14*   (2006.01)
*C08J 9/28*   (2006.01)
(Continued)

(52) U.S. Cl.
CPC ........ *H01M 2/145* (2013.01); *B01D 67/0025* (2013.01); *B01D 69/02* (2013.01);
(Continued)

(58) Field of Classification Search
CPC .... H01M 2/145; H01M 2/162; H01M 10/052; B01D 67/0025; B01D 63/087;
(Continued)

(56) References Cited

U.S. PATENT DOCUMENTS

2007/0015876 A1   1/2007   Inagaki et al.
2008/0290552 A1   11/2008   Inagaki et al.
(Continued)

FOREIGN PATENT DOCUMENTS

CN   100460453 C   2/2009
CN   102869710 A   1/2013
(Continued)

OTHER PUBLICATIONS

Extended European Search Report dated Oct. 30, 2018, of counterpart European Application No. 16803396.7.
(Continued)

*Primary Examiner* — Amanda C. Walke
(74) *Attorney, Agent, or Firm* — DLA Piper LLP (US)

(57) ABSTRACT

A polyolefin microporous membrane has excellent strength, permeability and heat resistance, which is obtained by using UHMwPE and employing a sequential stretching system, and a production method of the microporous membrane. In producing a microporous membrane by using a primary material A having a molecular weight (Mw) of less than $1.0 \times 10^6$, a secondary material B having a molecular weight of $1.0 \times 10^6$ or more, and a plasticizer, when the endothermic quantity of a mixture of the primary material and the plasticizer and the endothermic quantity of a mixture of the secondary material and the plasticizer are denoted as Q1 and Q2, respectively, respective resins are designed such that the ratio of endothermic quantity Q2 to endothermic quantity (Continued)

Q1 (endothermic quantity Q2/endothermic quantity Q1) becomes 1 or more over a temperature range of 110 to 118° C.

8 Claims, 14 Drawing Sheets

(51) Int. Cl.
| | | |
|---|---|---|
| C08J 5/18 | (2006.01) | |
| C08J 3/00 | (2006.01) | |
| B01D 71/26 | (2006.01) | |
| B01D 67/00 | (2006.01) | |
| B01D 69/02 | (2006.01) | |
| C08K 5/00 | (2006.01) | |
| C08L 23/04 | (2006.01) | |
| H01M 2/16 | (2006.01) | |
| H01M 10/052 | (2010.01) | |
| B01D 63/08 | (2006.01) | |

(52) U.S. Cl.
CPC .............. *B01D 71/26* (2013.01); *C08J 3/005* (2013.01); *C08J 5/18* (2013.01); *C08J 9/28* (2013.01); *C08K 5/0016* (2013.01); *C08L 23/04* (2013.01); *H01M 2/162* (2013.01); *H01M 10/052* (2013.01); *B01D 63/087* (2013.01); *B01D 2311/103* (2013.01); *C08F 2500/01* (2013.01); *C08J 2323/06* (2013.01); *C08J 2423/06* (2013.01); *C08L 2207/062* (2013.01)

(58) Field of Classification Search
CPC ............... B01D 69/02; B01D 2311/103; C08F 2500/01; C08J 5/18; C08J 9/28; C08L 23/04; C08L 2207/062
USPC ...................................... 429/231.95
See application file for complete search history.

(56) References Cited

U.S. PATENT DOCUMENTS

| | | | | |
|---|---|---|---|---|
| 2009/0092893 | A1* | 4/2009 | Takita | B29C 55/005 429/145 |
| 2009/0117453 | A1* | 5/2009 | Kikuchi | B32B 27/32 429/145 |
| 2009/0148761 | A1* | 6/2009 | Kikuchi | B32B 27/32 429/145 |
| 2009/0286161 | A1* | 11/2009 | Takita | B29C 55/065 429/249 |
| 2010/0069596 | A1* | 3/2010 | Kimishima | B29C 48/07 526/352 |
| 2010/0178503 | A1* | 7/2010 | Tam | C08L 23/06 428/372 |
| 2011/0259505 | A1* | 10/2011 | Lee | H01M 2/145 156/78 |
| 2013/0116355 | A1 | 5/2013 | Kang et al. | |
| 2014/0296454 | A1* | 10/2014 | Batinas-Geurts | C08F 110/02 526/124.5 |
| 2014/0349193 | A1 | 11/2014 | Kang et al. | |
| 2015/0270520 | A1* | 9/2015 | Stokes | H01M 2/162 429/145 |
| 2015/0280194 | A1* | 10/2015 | Mitsuoka | C08J 5/18 429/254 |
| 2016/0126520 | A1 | 5/2016 | Mizuno et al. | |
| 2016/0336569 | A1* | 11/2016 | Mizuno | H01M 2/145 |
| 2017/0125766 | A1* | 5/2017 | Harumoto | B32B 5/32 |
| 2017/0309883 | A1* | 10/2017 | Mizuno | B32B 27/32 |

FOREIGN PATENT DOCUMENTS

| | | |
|---|---|---|
| CN | 103865145 A | 6/2014 |
| EP | 1 679 338 A1 | 7/2006 |
| JP | 2009-91461 A | 4/2009 |
| JP | 2010-024463 A | 2/2010 |
| JP | 2010-106071 A | 5/2010 |
| JP | 2011-201949 A | 10/2011 |
| JP | 2011-210573 A | 10/2011 |
| JP | 2012-144649 A | 8/2012 |
| JP | 2013-530261 A | 7/2013 |
| JP | 2015-092488 A | 5/2015 |
| WO | 2009/038233 A1 | 3/2009 |
| WO | 2015/029944 A1 | 3/2015 |

OTHER PUBLICATIONS

Notification of the First Office Action dated Jan. 3, 2020, of counterpart Chinese Application No. 201680032622.X, along with an English translation.

* cited by examiner

METHOD OF PREPARING MICROPOROUS MEMBRANE, MICROPOROUS MEMBRANE, BATTERY SEPARATOR, AND SECONDARY BATTERY

TECHNICAL FIELD

This disclosure relates to a microporous membrane widely employed, for example, as a separation membrane used for separation, selective permeation of a substance and as a separator material of an alkali or lithium secondary battery, a fuel cell or an electrochemical reactor such as capacitor. More specifically, this disclosure relates to a polyolefin microporous membrane suitably used as a separator for a lithium ion battery and relates to a production method thereof, ensuring that the microporous membrane has excellent strength, permeability, heat resistance and productivity, compared with conventional production methods.

BACKGROUND

A polyolefin microporous membrane is used, for example, as a filter, a separator for a fuel cell, or a separator for a capacitor. In particular, the membrane is suitably used as a separator for a lithium ion battery widely employed for a notebook personal computer, a cell-phone, a digital camera or the like. The reason therefor is that the polyolefin microporous membrane is a membrane having excellent mechanical strength and shutdown properties. Furthermore, the lithium ion secondary battery is being developed toward achieving higher energy density, higher capacity and higher output, and in association therewith, higher properties are required for the separator.

The production method of a polyolefin microporous membrane includes a method of blending a plasticizer or an inorganic filler with a resin composition and extracting the plasticizer or inorganic filler before membrane production or after stretching (wet process), and a method of opening pores by utilizing a crystal interface of a resin composition or an interface of an inorganic filler and a resin composition, without blending a plasticizer (dry process).

The dry process does not require a plasticizer extraction step, a drying step or the like and is, therefore, excellent in economical efficiency, but at the same time has a problem that, for example, the mechanical strength is low and since uniform pores are difficult to obtain, the quality is liable to be uneven. On the other hand, the wet process includes a large number of steps compared with the dry process and has poor economical efficiency but at the same time, is advantageous in that uniform pores can be obtained and the mechanical strength is excellent.

The wet process includes two techniques, i.e., a method of extracting a plasticizer before stretching and a method of extracting a plasticizer after stretching. As for the method of extracting a plasticizer before stretching, JP-A-2010-24463 discloses a method of melting and kneading a polyolefin and a plasticizer to produce a sheet and extracting part of the plasticizer before stretching. In that technique, since the plasticizer is removed before stretching, compared with the case of stretching the sheet in a plasticizer-containing state, stretching tension is high and stretching may not be easily performed. Also, JP-A-2012-144649 discloses a method of melting/kneading a polyolefin, a plasticizer and an inorganic particle to produce a sheet, extracting the plasticizer and the inorganic filler with use of a solvent, and performing stretching. In that membrane production method, since a plasticizer is not contained at the time of stretching, the stretching tension is high. In addition, pores are formed using an inorganic filler, giving rise to a problem that the pores are coarsened and non-uniformized. Accordingly, when stretching is performed at a high stretch ratio to obtain high mechanical strength, it is disadvantageously difficult to stably produce the membrane.

In the method of extracting a plasticizer after stretching, the polyolefin is softened by the plasticizer, and this facilitates molding, provides excellent process stability and enables formation of uniform pores. Because of these advantages, the method of extracting a plasticizer after stretching is commonly used. The stretching method includes simultaneous biaxial stretching of simultaneously conducting longitudinal stretching (hereinafter, MD stretching) and transverse stretching (hereinafter, TD stretching), uniaxial stretching of subjecting a gel-like molded product before extraction of a plasticizer to stretching at least in one direction, and sequential biaxial stretching of performing TD stretching after MD stretching.

JP-A-2010-106071 states that simultaneous biaxial stretching is preferably used from the viewpoint of enhancing the puncture strength of a polyolefin microporous membrane and providing a uniform membrane thickness. However, as described in JP-A-2009-91461, in applying a high stretch ratio, since a sheet before stretching is thick, simultaneous stretching is liable to be associated with a phenomenon of separation of the sheet from a chuck, and the production stability may decrease. Furthermore, the simultaneous biaxial stretching method has a problem that due to an equipment issue, adjustment of MD and TD stretch ratios is difficult and the adjustable range of film physical properties is narrow.

JP-A-2009-91461 and JP-A-2011-210573 describe sequential stretching. The stretch ratio, stretching speed, stretching temperature and the like in MD and TD can be appropriately adjusted, and a wide range of products can be produced. In addition, stretching is conducted separately in MD and TD, and an orientation can thereby be efficiently created, which is advantageous in that, for example, compared with simultaneous stretching, high strength is likely to be obtained even at the same areal stretch ratio.

It has been conventionally known that the overall strength of a separator film is enhanced by the addition of an ultrahigh molecular weight polyolefin (hereinafter, UHMwPE), and JP-A-2011-201949 describes a sequential stretching method using UHMwPE and adopting a method of extracting a plasticizer before stretching. However, JP '949 discloses that the degree of orientation is controlled by using UHMwPE having a large molecular weight to achieve excellent heat resistance, SD temperature and permeability. Although UHMwPE is added, good strength is not obtained, and the shrinkage ratio is increased. In addition, since an ultrahigh molecular weight polyolefin is added, the pressures of an extruder and a spinneret are high and when the discharge rate of a resin is raised to increase the thickness of a sheet before stretching for obtaining a higher MD stretch ratio, there arises a problem that, for example, the membrane production is difficult due to an excessive increase in the pressure. Also, a problem of incapability of ensuring stretchability or uniformity still remains.

JP-T-2013-530261 describes a method not using UHMwPE as the production method ensuring excellent extrusion, kneading and stretching properties, which are the challenge above. Adoption of this method makes it possible to realize high discharge by virtue of low viscosity compared with the UHMwPE addition system, prevent a problem that membrane production is difficult due to an excessive increase in the stretching tension, and obtain a microporous membrane with excellent productivity. In addition, a microporous membrane having higher strength and permeability than in JP-A-2011-201949 is obtained. However, heat resistance that has been conventionally unachievable only with HDPE is achieved by the addition of UHMwPE and, to serve customer needs diversified accompanying the trend toward higher energy density, higher capacity and higher output, UHMwPE must be added.

As described above, the sequential wet stretching system is advantageous in that various products can be produced to meet diversified customer needs with less mechanical restriction and the productivity is excellent, but on the other hand, has a drawback of difficulty in terms of high discharge keeping up with an increase in the degree of freedom of stretch ratio, productivity including appearance improvement, and UHMwPE addition.

It could therefore be helpful to provide a polyolefin microporous membrane having excellent strength, permeability and heat resistance, which is obtained by using UHMwPE and employing a sequential stretching system, and a production method of the microporous membrane.

SUMMARY

We thus provide:

A method of producing a microporous membrane including:

1) melt-kneading a primary material having a molecular weight (Mw) of less than $1.0 \times 10^6$, a secondary material having a molecular weight of $1.0 \times 10^6$ or more, and a plasticizer;
2) extruding the molten mixture obtained in the step 1) through a spinneret to mold into a sheet shape;
3) stretching the sheet obtained in the step 2) by a sequential stretching method including a roll system or a tenter system; and
4) extracting the plasticizer from the stretched film obtained in the step 3) to produce a polyolefin microporous membrane, in which, when an endothermic quantity of a mixture of the primary material and the plasticizer and an endothermic quantity of a mixture of the secondary material and the plasticizer are denoted as Q1 and Q2, respectively, a ratio of the endothermic quantity Q2 to the endothermic quantity Q1, (endothermic quantity Q2 /endothermic quantity Q1), is 1 or more over a temperature range from 110 to 118° C.

When an endothermic quantity of a mixture of the primary material, the secondary material and the plasticizer is denoted as Q3, a mixing ratio of the primary material and the secondary material may be set such that a ratio of the endothermic quantity Q3 to the endothermic quantity Q1, (endothermic quantity Q3 /endothermic quantity Q1), becomes 1.1 or more over a temperature range from 110 to 120° C.

The step 3) may be performed by a roll system using a stretching apparatus including one or more preheating rolls, one or more stretching rolls, and one or more cooling rolls, a preheating time using the preheating roll may be from 1 to 500 seconds, a stretch ratio in one stretching section using the stretching roll may be from 1.01 to 6.0 times, and a strain rate in the stretching section may be a rate of 5 to 450%/sec.

The primary material and the secondary material each may have an average particle diameter of from 80 µm to 250 µm.

A ratio of the average particle diameter of the primary material to the average particle diameter of the secondary material, (average particle diameter of primary material/average particle diameter of secondary material), may be from 0.3 to 1.5.

A kneading temperature in the step 1) may be from 140 to 250° C.

The step 1) may be performed using a twin-screw extruder having a screw, and a ratio Q/Ns of an extrusion quantity Q (kg/h) of a polyolefin solution as a mixture of the primary material, the secondary material and the plasticizer to a screw rotational speed (Ns) of the twin-screw extruder may be set to be from 0.01 kg/h/rpm to 2.5 kg/h/rpm.

The average particle diameter of the primary material may be from 100 µm to 250 µm, and the average particle diameter of the secondary material may be from 90 µm to 250 µm.

The step 3) may be a step of stretching the sheet at a stretch ratio of 5 to 10 times in a length direction (MD) and at a stretch ratio of 5 to 9 times in a width direction (TD).

Additionally, a microporous membrane which is a polyolefin-based microporous membrane includes a primary material having a molecular weight (Mw) of less than $1.0 \times 10^6$, a secondary material having a molecular weight of $1.0 \times 10^6$ or more, and a plasticizer, in which, when an endothermic quantity of a mixture of the primary material and the plasticizer and an endothermic quantity of a mixture of the secondary material and the plasticizer are denoted as Q1 and Q2, respectively, a ratio of the endothermic quantity Q2 to the endothermic quantity Q1, (endothermic quantity Q2 /endothermic quantity Q1), is 1 or more over a temperature range from 110 to 118° C.

A separator for a nonaqueous electrolyte secondary battery uses the above-described microporous membrane.

A nonaqueous electrolyte secondary battery uses the above-described separator.

Thus, a raw material having a configuration where, when the endothermic quantity of a mixture of a primary material (a resin having a molecular weight of less than $1.0 \times 10^6$) and a plasticizer and the endothermic quantity of a mixture of a secondary material (a resin having a molecular weight of $1.0 \times 10^6$ or more) and a plasticizer are denoted as Q1 and Q2, respectively, the ratio of the endothermic quantity Q2 to the endothermic quantity Q1, (endothermic quantity Q2 /endothermic quantity Q1), is 1 or more over a temperature range from 110 to 118° C., is used, and therefore, a resin having Mw of $1.0 \times 10^6$ or more, which has been conventionally difficult to be uniformly kneaded, can be used so that a polyolefin microporous membrane having an excellent balance of productivity, strength, permeability and heat resistance can be obtained.

DETAILED DESCRIPTION (1) Polyolefin Resin

Figure 1:
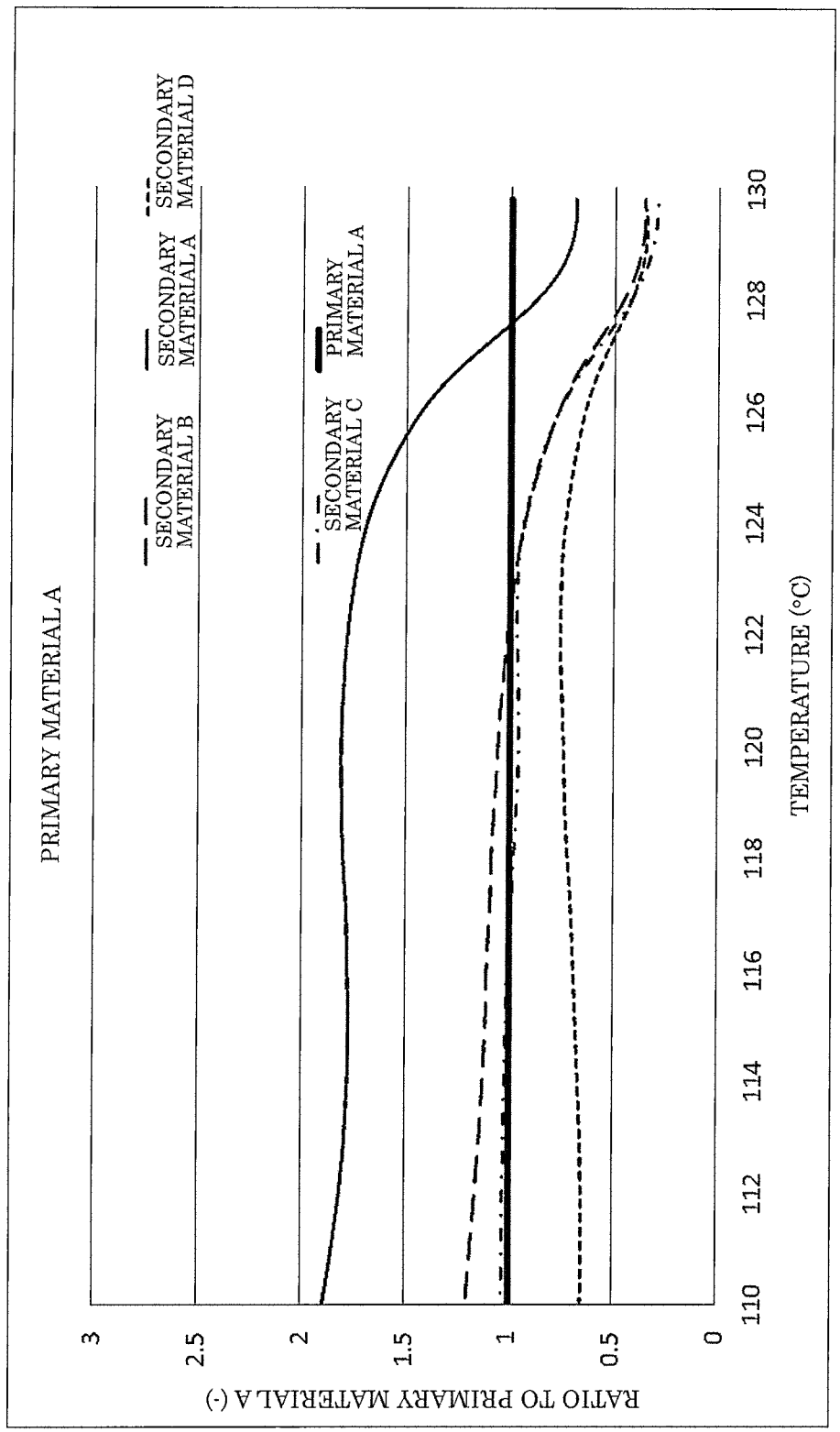
FIG. 1 is a characteristic diagram showing experimental results obtained.
Figure 2:
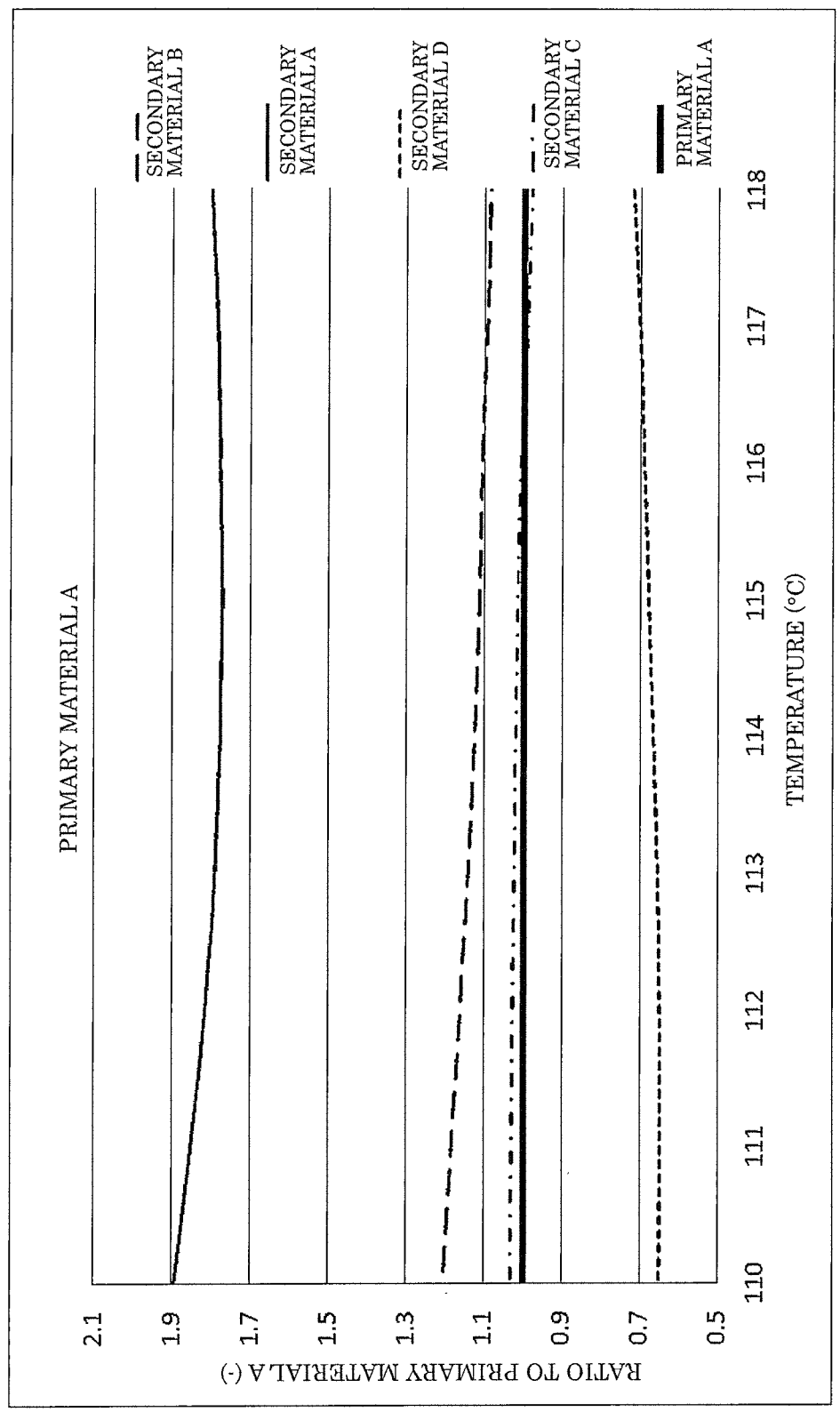
FIG. 2 is a characteristic diagram enlarging a part of FIG. 1.
Figure 3:
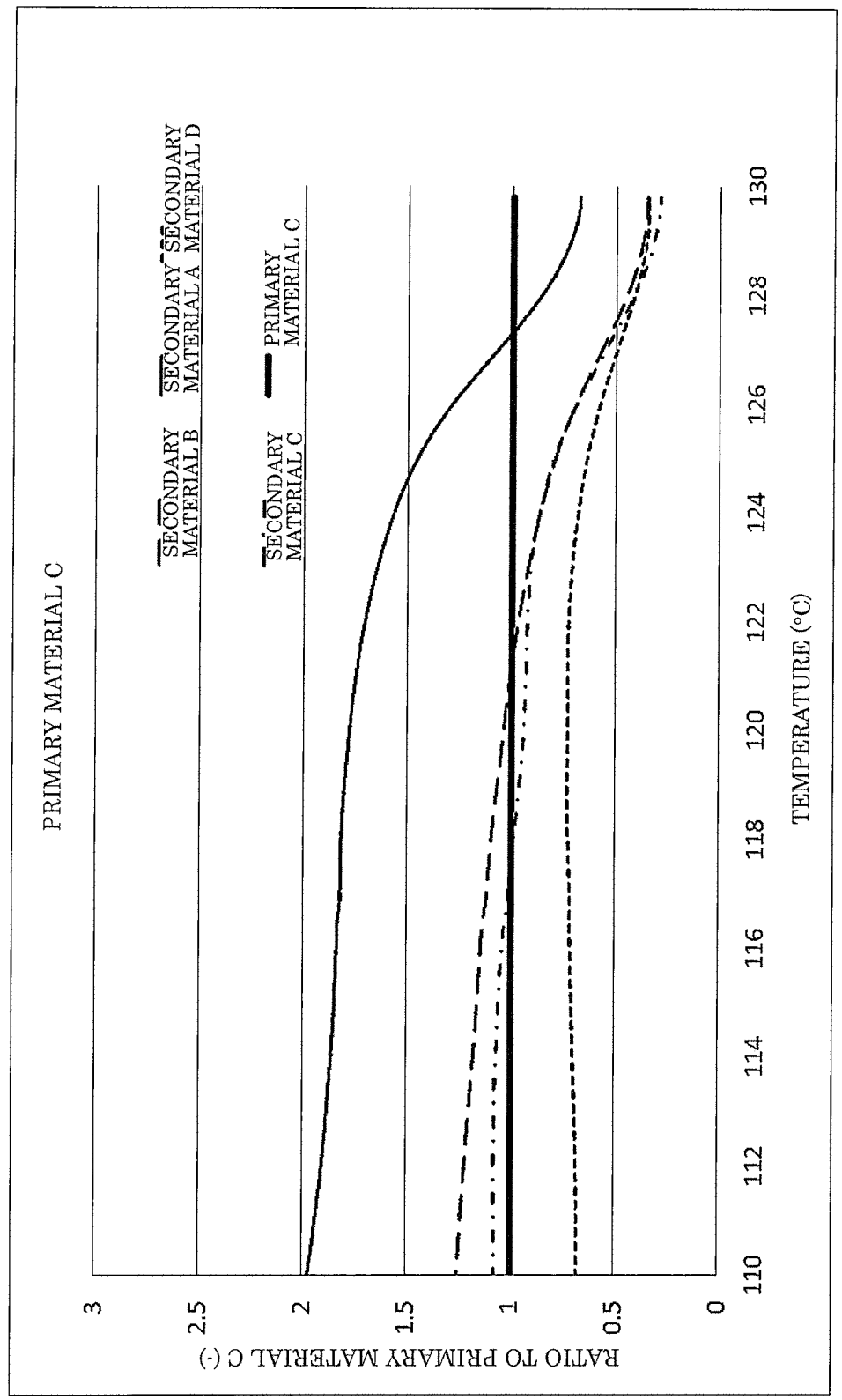
FIG. 3 is a characteristic diagram showing experimental results obtained.
Figure 4:
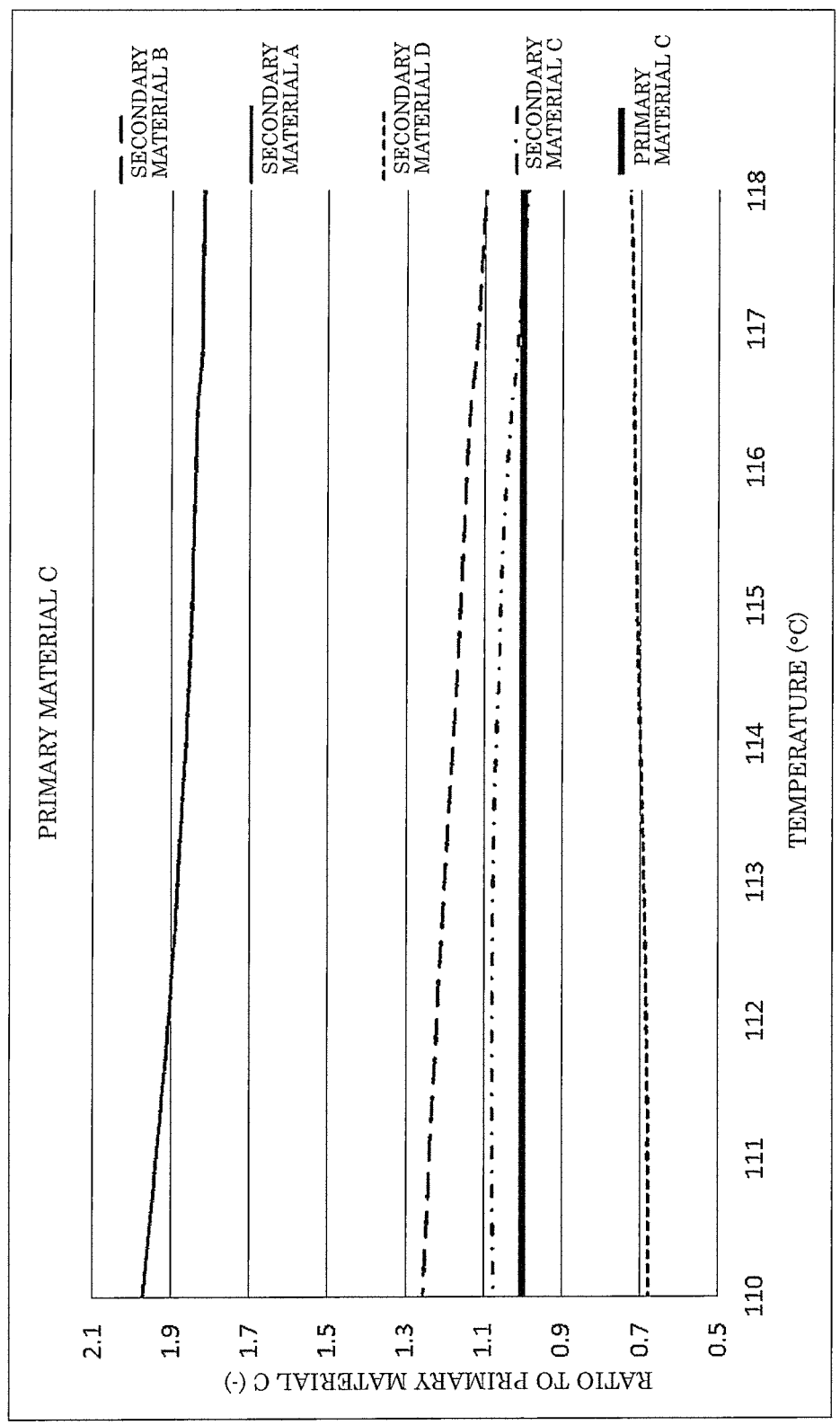
FIG. 4 is a characteristic diagram enlarging a part of FIG. 3.
Figure 5:
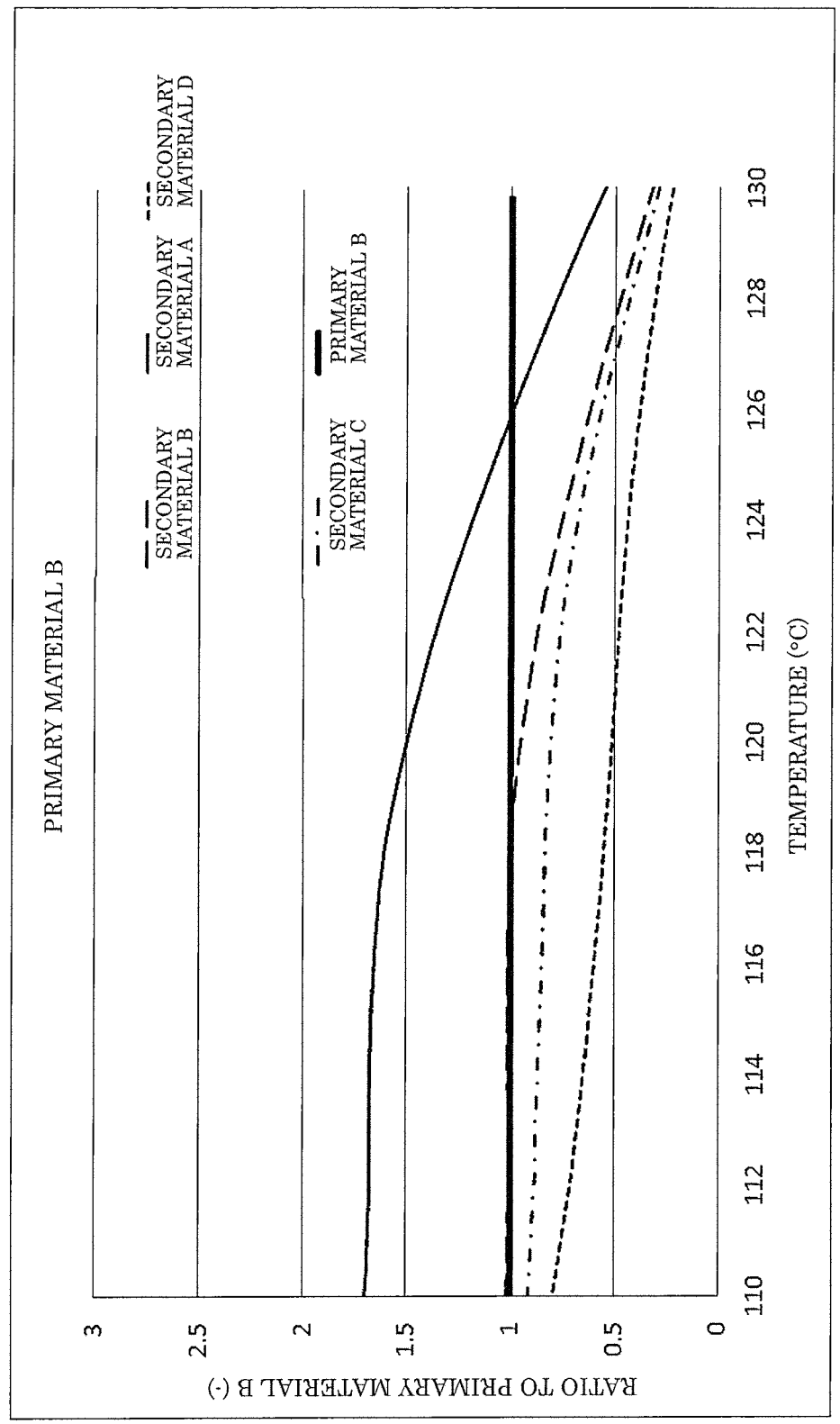
FIG. 5 is a characteristic diagram showing experimental results obtained.
Figure 6:
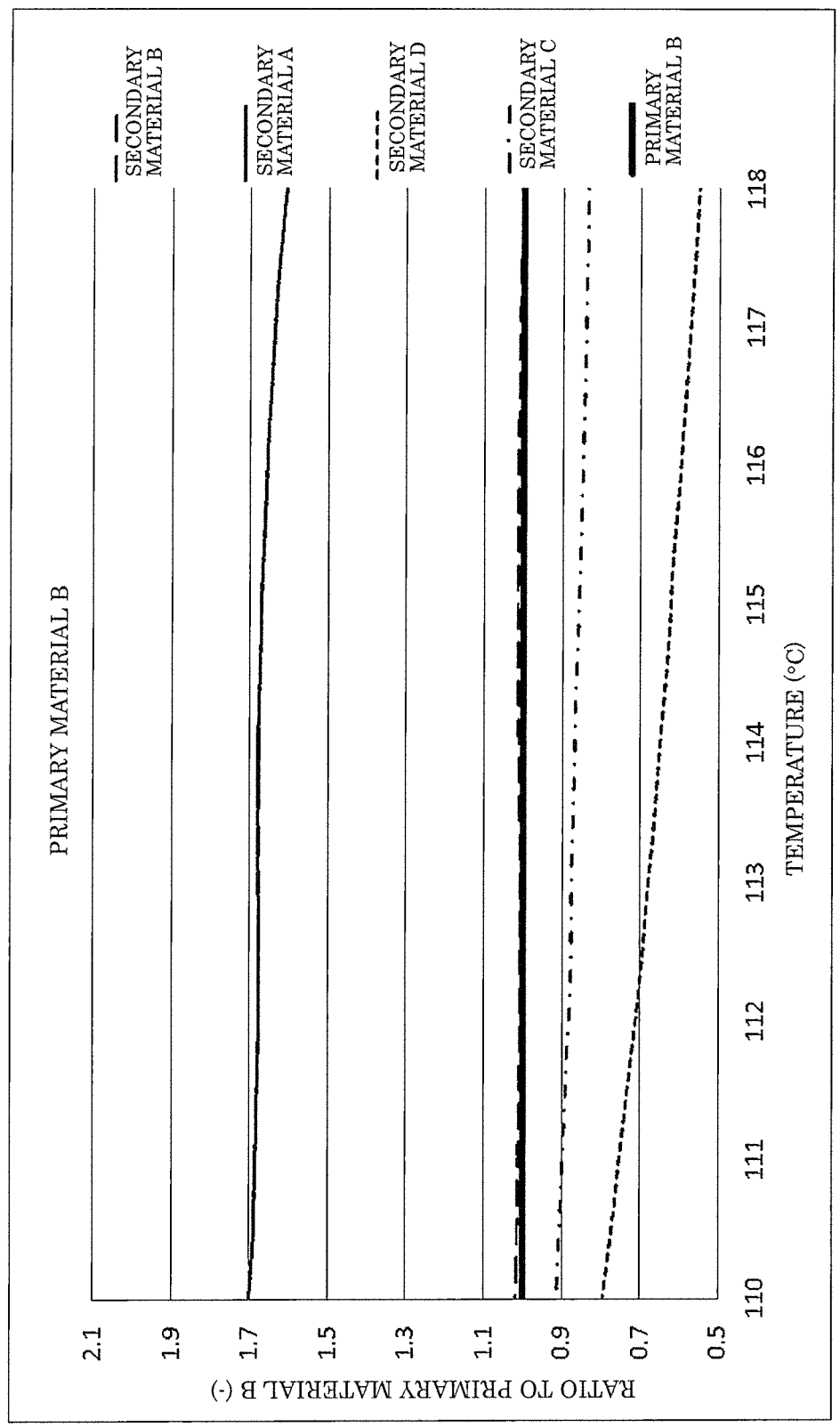
FIG. 6 is a characteristic diagram enlarging a part of FIG. 5.

The polyolefin resin is preferably a polyolefin and may be a polyolefin composition. The polyolefin includes, for example, polyethylene and polypropylene, and these may be used by blending two or more kinds thereof. The weight average molecular weight (hereinafter referred to as Mw) of the polyolefin resin is preferably $1 \times 10^5$ or more. If Mw is less than $1 \times 10^5$, rupture may readily occur at the time of stretching.

The polyolefin resin preferably contains polyethylene as a main component. To enhance the permeability and mechanical strength of a microporous membrane, assuming the entire polyolefin resin is 100 mass %, the proportion of the polyethylene is preferably 80 mass % or more, more preferably 90 mass % or more, and it is still more preferable to use polyethylene alone. The polyethylene may not only be a homopolymer of ethylene but also be a copolymer containing a small amount of another α-olefin. Examples of the α-olefin include propylene, butene-1, hexene-1, pentene-1, 4-methylpentene-1, octene, vinyl acetate, methyl methacrylate, and styrene.

The kind of the polyethylene includes a high-density polyethylene having a density of more than 0.94 g/cm$^3$ (hereinafter, sometimes referred to as "HDPE), a medium-density polyethylene having a density of 0.93 to 0.94 g/cm$^3$, a low-density polyethylene having a density of less than 0.93 g/cm$^3$, a linear low-density polyethylene and the like, but to increase the membrane strength, a high-density polyethylene and a medium-density polyethylene are preferably used, and these may be used individually or as a mixture.

When a low-density polyethylene, a linear low-density polyethylene, an ethylene.α-olefin copolymer produced with a single-site catalyst, or a low-molecular-weight polyethylene having a weight average molecular weight of 1,000 to 4,000 is added, a shutdown function at a low temperature is imparted, and the properties as a battery separator can be enhanced. However, if the proportion of the low-molecular-weight polyethylene is large, rupture of a microporous membrane readily occurs in the stretching step at the time of production, and for this reason, the amount added of the low-density polyethylene is preferably 0 to 20 mass % in the polyolefin resin.

When adding polypropylene, the meltdown temperature can be enhanced when the polyolefin microporous membrane is used as a battery separator. As for the kind of polypropylene, a block copolymer and a random copolymer may be used, in addition to a homopolymer. The block copolymer or random copolymer may contain a copolymer component with another α-ethylene, except for propylene, and the other α-ethylene is preferably ethylene. However, when polypropylene is added, the mechanical strength is likely to be reduced, compared with using polyethylene alone, and therefore, the amount added of polypropylene is preferably from 0 to 20 mass % in the polyolefin resin. Accordingly, out of the polyolefin-based resins constituting the microporous membrane, the proportion of the total of the ultrahigh molecular weight polyethylene and high-density polyethylene is preferably 60 wt % or more, more preferably 65 wt % or more, most preferably 70 wt % or more, relative to all polyolefin-based resins.

Our membranes contain an ultrahigh molecular weight polyolefin resin having a weight average molecular weight (hereinafter referred to as Mw) of $1.0 \times 10^6$ or more and less than $4.0 \times 10^6$. By containing an ultrahigh molecular weight polyolefin (hereinafter referred to as UHMwPO), formation of micropores and realization of high heat resistance can be achieved and furthermore, the puncture strength can be enhanced.

As the ultrahigh molecular weight polyolefin resin, use of ultrahigh molecular weight polyethylene (hereinafter referred to as UHMwPE or UHPE) is preferred. The ultrahigh molecular weight polyethylene may not only be a homopolymer of ethylene but also be a copolymer containing a small amount of another α-olefin. The other α-olefin except for ethylene may be the same as those described above. Mw of the ultrahigh molecular weight polyethylene is preferably $1.0 \times 10^6$ or more and less than $4.0 \times 10^6$. By using an ultrahigh molecular weight polyethylene having Mw of $1.0 \times 10^6$ or more and less than $4 \times 10^6$, the sheet strength is increased, making it possible to prevent a sheet from curling in the MD stretching step, the TD stretching step and the like, and since the adhesion of a sheet to a roll is improved, a phenomenon of slippage or separation of the sheet from the chuck during stretching can be prevented, as a result, the productivity is enhanced. When Mw is $4.0 \times 10^6$ or less, an excessive increase in the viscosity of a melt can be prevented, enabling a resin to be easily extruded from a spinneret, and a good (small) heat shrinkage ratio is also obtained. In view of uniform kneading with HDPE, the molecular weight of UHMwPE is preferably less than $4.0 \times 10^6$, more preferably less than $3.0 \times 10^6$. When the molecular weight of UHMwPE is less than $4.0 \times 10^6$, absorption of a plasticizer is facilitated, and UHMwPE is sufficiently plasticized by not allowing HDPE to excessively absorb a plasticizer, as a result, dissolution is promoted to enable uniform kneading and provide good membrane production properties. The molecular weight of UHMwPE is preferably smaller because the above-described plasticizing effect is readily obtained and good kneadability is achieved, but in view of strength or heat resistance, the molecular weight thereof is preferably $1.0 \times 10^6$ or more.

As for the combination of UHMwPE and HDPE, in view of uniform kneading, the matter of importance is to use, as a secondary material, UHMwPE exhibiting fast plasticizer absorption compared with HDPE working out to a primary material. In other words, it is important that UHMwPE plasticizes, swells and dissolves faster than HDPE, in the temperature region before each of HDPE having a reduced melting point due to a plasticizing effect and UHMwPE starts melting. Specifically, UHMwPE and HDPE are combined such that the ratio of the endothermic quantity $Q2$ of a mixture of UHMwPE and a plasticizer to the endothermic quantity $Q1$ of a mixture of HDPE and a plasticizer, (endothermic quantity $Q2$/endothermic quantity $Q1$), which are observed at an arbitrary temperature by using DSC, is 1.0 or more over 110 to 118° C. Within the range above, UHMwPE that is less likely to dissolve compared with HDPE first comes under a plasticizing effect, and the melting point of UHMwPE can thereby be lowered. As a result, dissolution of UHMwPE starts at a temperature close to the dissolution temperature of HDPE, enabling uniform melting of UHMwPE and UHPE, and deterioration of the outer appearance due to non-melting is suppressed.

As for the sheet composition in the step of melting/kneading/extruding a polyolefin resin and a diluent, assuming the entire resin is 100 mass %, the proportion of UHMwPO is preferably 6 mass % or more, more preferably 10 mass % or more, still more preferably 18 mass % or more. When the proportion of UHMwPO is 6 mass % or more, a sheet is not too much soft and can be prevented from occurrence of curling, and a uniform sheet can be molded. In addition, when the proportion of UHMwPO is 6 wt % or more, the effect of plasticizing UHMwPO is sufficiently exerted by preventing HDPO from excessively absorbing a plasticizer, and a difference is less likely to be produced in the dissolution temperature, as a result, an appearance failure is prevented without generation of non-melting. When the proportion of UHMwPO is 10 mass % or more, the sheet provides more increased strength and is hardly curled, and the process stability increases. When the proportion of UHMwPO is 18 mass % or more, not only the process stability increases but also the ratio of the endothermic quantity $Q3$ of a mixture of HDPO, UHMwPO and a plasticizer to the endothermic quantity $Q1$ of a mixture of HDPO (high-density polyolefin) and a plasticizer, (endothermic quantity $Q3$/endothermic quantity $Q1$), becomes 1.1 or more over a range from 110 to 120° C. and since HDPO is prevented from excessive plasticizer absorption and UHMwPE is sufficiently plasticized, dissolution is promoted in the melt-kneading step, enabling uniform kneading, as a result, good membrane production properties are obtained. When the proportion of UHMwPO is 60 wt % or less, the extrusion load hardly increases, allowing the extrusion moldability to be maintained, and the production stability is ensured by reducing the load applied to a stretching machine in the longitudinal stretching process.

With respect to the blending ratio between a polyolefin resin and a plasticizer, assuming the total of a polyolefin resin and a plasticizer is 100 wt %, the content of the polyolefin resin is preferably 50 wt % or less in view of kneadability of resins. When the content of the polyolefin resin is 50 wt % or less, plasticization of both HDPO and UHMwPO sufficiently proceeds, and a uniformly dissolved resin is obtained. When the content of the polyolefin resin is 20% or more, a problem caused by increase in the oil content in the sheet at the time of roll stretching such as slippage or appearance failure, can be prevented, and good productivity is obtained. In addition, from the viewpoint of improving the moldability of an extrudate, the content of the polyolefin resin is 10 to 50 wt %, preferably 10 to 40 wt %. The content of the polyolefin resin is more preferably 20 to 40 wt %. When the content of the polyolefin is 10 wt % or more (the content of the plasticizer is 90 wt % or less), swelling or neck-in at the spinneret exit is suppressed at the time of molding into a sheet shape, sheet moldability is maintained, and the membrane production properties are stabilized. On the other hand, when the content of the polyolefin resin is 50 wt % or less (the content of the plasticizer exceeds 50 wt %), shrinkage in the thickness direction is suppressed, and the molding processability is stabilized.

As for the average particle diameter of the polyolefin, if only solubility is sought, in consideration of the fact that heat is transferred from the outside to the inside of a particle, the particle diameter is preferably smaller, but in view of fluidity of the resin, the particle diameter is preferably 80 µm or more. The average particle diameter of the polyolefin is more preferably 100 µm or more, still more preferably 130 µm or more. When the average particle diameter of the polyolefin is 80 µm or more, deterioration of fluidity due to blocking or aggregation of the resin is less likely to occur, and the process stability is improved. In view of solubility of the resin, the average particle diameter of the polyolefin is preferably 250 µm or less. The average particle diameter of the polyolefin is more preferably 180 µm or less. The amount used of HDPO working out to a primary material is large and therefore, in view of balance of fluidity and solubility, the average particle diameter thereof is preferably 100 µm or more. The average particle diameter of HDPO is more preferably 105 µm or more, still more preferably 120 µm or more, yet still more preferably 130 µm or more. When the average particle diameter of HDPO is 100 µm or more, UHMwPO is readily plasticized, because the solubility of HDPO is not so high, and the kneadability is improved. The average particle diameter of UHMwPO working out to a secondary material is preferably 90 µm or more, more preferably 130 µm or more, still more preferably 160 µm or more. When the average particle diameter of UHMwPO is 90 µm or more, deterioration of the kneadability can be suppressed even if a difficultly dissolvable resin having a large molecular weight is used. The ratio of average particle diameters of HDPO and UHMwPO (average particle diameter of HDPO/average particle diameter of UHMwPO) is preferably 0.35 or more and 1.5 or less. When the ratio of average particle diameters is 0.35 or more and 1.5 or less, both HDPO and UHMwPO are sufficiently plasticized to provide uniform kneadability, and the outer appearance is improved. In view of kneadability, the ratio of average particle diameters of HDPO and UHMwPO (HDPO/UHMwPO average particle diameters) is more preferably 0.35 or more and 1.0 or less. Usually, it is considered that UHMwPO having a large molecular weight does not easily dissolve and is therefore preferably set to have a small average particle, but our control is superior in terms of appropriately controlling the molecular weight and the average particle diameter, thereby obtaining good solubility even when UHMwPO having a relatively large particle diameter is used.

The polyolefin microporous membrane may also contain various additives such as antioxidant, heat stabilizer, antistatic agent, ultraviolet absorber, anti-blocking agent and filler, as long as the desired effects are not impaired. In particular, it is preferable to add an antioxidant for the purpose of suppressing oxidative deterioration due to thermal history of the polyethylene resin. Appropriately selecting the kind and amount added of an antioxidant or heat stabilizer is important for adjusting or enhancing the properties of the microporous membrane.

(2) Production Method of Polyolefin Microporous Membrane

The method of producing a polyolefin microporous membrane is specifically described below. The production method includes the following steps:

(a) melt-kneading a plasticizer and a polyolefin resin containing an ultrahigh molecular weight polyolefin having a weight average molecular weight of $2 \times 10^6$ or more and less than $4 \times 10^6$;

(b) extruding the molten mixture obtained in the step (a) into a sheet shape from an extruder;

(c) stretching the sheet obtained in the step (b) by a sequential stretching method including a roll system or a tenter system;

(d) extracting the plasticize from the stretched film obtained in the step (c); and (e) drying the film obtained in the step (d).

Other steps may be added before, in the middle of, or after the stages of (a) to (e), but (c) sequential stretching in the longitudinal/transverse direction must necessarily be performed before stages of (d) extraction of plasticizer and (e) drying of film.

Figure 13:
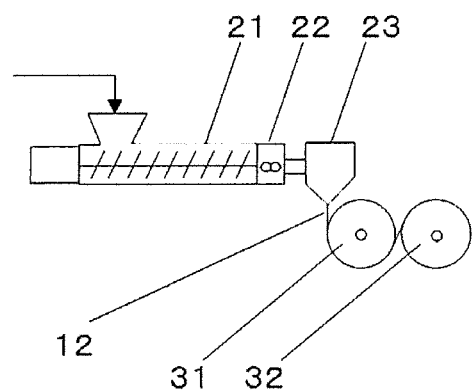
FIG. 13 is one example of the microporous membrane production apparatus used.
Figure 14:
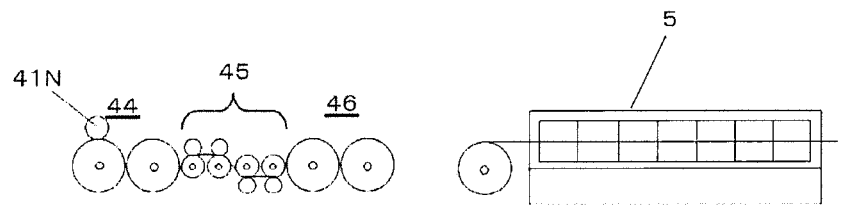
FIG. 14 is one example of the microporous membrane production apparatus used.
Figure 15:
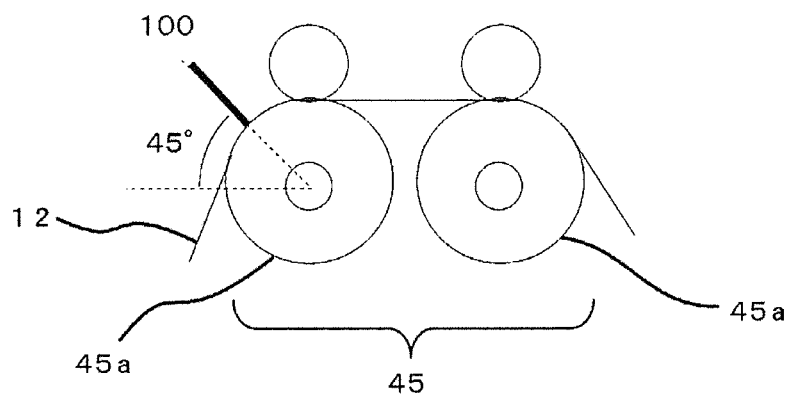
FIG. 15 is one example of the microporous membrane production apparatus used.

A schematic side view of the production process of a microporous membrane according to one example is illustrated in FIGS. 13 to 15. The apparatus used in the step of melt-kneading a polyolefin solution is not particularly limited but includes, for example, a calender, various mixers, and an extruder 21 having a screw as illustrated in FIG. 13. In FIG. 13, 23 is a spinneret (die). The polyolefin solution melt-kneaded in the extruder 21 is discharged in sheet shape through a slit part of the spinneret 23 while weighing the solution with a gear pump 22. The discharged sheet 12 comes into contact with a cooling drum 31 and solidified. At this time, the polyolefin portion of the sheet 12 forms a crystal structure, and this structure works out to a pillar for holding pores of the later-formed microporous membrane. The sheet 12 includes therein a diluent kneaded within the extruder 21 and enters a gel state. Subsequently, the gel-like sheet 12 is stretched in the sheet conveying direction by a plurality of roller groups, and both end parts of the sheet 13 are then appropriately and continuously gripped with clips or the like to stretch the sheet in the width direction (the direction orthogonal to the conveying direction) while heating and keeping warm the sheet in an oven 5. FIG. 14 is a schematic diagram of a sheet-conveying-direction stretching (longitudinal stretching) step and illustrates a stretching apparatus including a preheating part 44, a stretching part 45, and a cooling part 46. FIG. 15 illustrates an enlarged diagram of stretching rolls. Stretching is performed by creating a large difference in the speed between mutually adjoining rolls 45a and 45a. Out of these two rolls 45a and 45a, the upstream-side roll 45a may be a roll of the stretching part 45 or may be shared with a most downstream-side roll in the preheating part 44. As to such a pair of rolls 45a and 45a, a plurality of pairs may be provided in the stretching part 45. The region between rolls 45a and 45a, in which stretching is performed, defines one stretching section. Accordingly, such stretching is continuously performed by disposing a longitudinal stretching machine for stretching the gel-like sheet in the longitudinal direction and a transverse stretching machine for stretching the sheet in the transverse direction to adjoin each other in the microporous membrane production direction (the direction running from the extruder side toward the microporous membrane winding side), and using these longitudinal stretching machine and transverse stretching machine. The term "continuous" means an antonym of "batch-type" and specifically indicates that the process, including from the supply of raw materials to the winding of microporous membrane, is performed constantly.

In this case, similarly to the cooling drum, the unit in the longitudinal stretching step includes a surface made of a metal or the like and a roller having in the inside thereof a conventional temperature control mechanism such as heater, and the driving is also the same. In addition, although not illustrated in FIG. 13, an idler roller that is not driven may also be appropriately disposed to provide a degree of freedom to the roller path. In the longitudinal stretching step, a nip roller 41N is preferably provided to avoid, even when the sheet meanders in the longitudinal stretching step, allowing the effect of tension fluctuation due to meandering to extend to the casting step or to prevent the sheet temperature before stretching from causing an uneven rise due to non-uniformly trapped air. The diluent is washed/removed from the thus-obtained uniaxially stretched sheet or biaxially stretched sheet by a conventionally employed technique, for example, the method described in WO 2008/016174 and through drying, a dried microporous membrane can be obtained. At the time of obtaining a microporous membrane, reheating and re-stretching may be applied in a dry stretching step after the washing and drying steps. The re-stretching step may employ either a roller system or a tenter system, and when a heat treatment is applied in the same step, adjustment of physical properties or removal of residual strain can be performed.

(a) Preparation of Polyolefin Solution

A polyolefin solution is prepared by dissolving a polyolefin resin in a plasticizer under heating.

The plasticizer is not particularly limited as long as it is a solvent capable of sufficiently dissolving polyethylene. To enable stretching at a relatively high stretch ratio, the solvent is preferably a liquid at room temperature. Examples of the liquid solvent include an aliphatic, cycloaliphatic or aromatic hydrocarbon such as nonane, decane, decalin, paraxylene, undecane, dodecane and liquid paraffin, a mineral oil distillate having a boiling point corresponding to that of the hydrocarbon above, and a phthalic acid ester that is a liquid at room temperature such as dibutyl phthalate and dioctyl phthalate. To obtain a stable gel-like sheet having a stable liquid solvent content, it is preferable to use a nonvolatile liquid solvent such as liquid paraffin. A solvent that is miscible with polyethylene in a melt-kneaded state but is a solid at room temperature may be mixed with the liquid solvent. Examples of such a solid solvent include stearyl alcohol, ceryl alcohol, and paraffin wax. However, use of only a solid solvent may generate stretching unevenness or the like.

The viscosity of the liquid solvent is preferably 20 to 200 cSt at 40° C. When the viscosity at 40° C. is 20 cSt or more, a sheet formed by extruding the polyolefin solution through a die is less likely to be non-uniform. On the other hand, when the viscosity is 200 cSt or less, removal of the liquid solvent is facilitated.

(b) Formation of Extrudate and Formation of Gel-Like Sheet

Uniform melt-kneading of the polyolefin solution is not particularly limited, but when intending to prepare a high-concentration polyolefin solution, the melt-kneading is preferably performed in a twin-screw extruder. If desired, various additives such as antioxidant may be added as long as the desired effects are not impaired. In particular, it is preferable to add an antioxidant to prevent oxidation of polyethylene.

In the extruder, the polyolefin solution is uniformly mixed at a temperature allowing for complete melting of the polyolefin resin. The melt-kneading temperature varies depending on the polyolefin resin used but is preferably from (melting point of polyolefin resin+10° C.) to (melting point of polyolefin resin+120° C.). The melt-kneading temperature is more preferably from (melting point of polyolefin resin+20° C.) to (melting point of polyolefin resin+100° C.). The "melting point" a used herein refers to a value determined by DSC based on JIS K7121 (1987) (hereinafter the same). For example, in polyethylene, the melt-kneading temperature is preferably 140 to 250° C. In the case of polyethylene, the melt-kneading temperature is more preferably 160 to 230° C., most preferably 170 to 200° C. Specifically, since the polyethylene composition has a melting point of approximately 130 to 140° C., the melt-kneading temperature is preferably 140 to 250° C., most preferably 180 to 230° C.

The melt-kneading temperature in the case of containing polypropylene in the polyolefin solution is preferably 190 to 270° C., more preferably 190 to 250° C.

From the viewpoint of suppressing resin deterioration, the melt-kneading temperature is preferably lower, but if the melt-kneading temperature is lower than the temperature described above, a non-melt is generated in the extrudate extruded through a die and may cause membrane rupture or the like in a subsequent stretching step. If the melt-kneading temperature is higher than the temperature described above, pyrolysis of polyethylene is intensified, and the obtained microporous membrane may have poor physical properties such as puncture strength and tensile strength. In addition, a decomposition product may deposit, for example, on a chill roll or a roll in the stretching step and attach to the sheet, leading to deterioration of the outer appearance. Accordingly, kneading is preferably performed within the range above.

As for the blending ratio of the polyolefin resin and the plasticizer, assuming the total of the polyolefin resin and the plasticizer is 100 wt %, from the viewpoint of improving moldability of the extrudate, the content of the polyolefin resin is 10 to 50 wt %, preferably 10 to 40 wt %. The content of the polyolefin resin is more preferably 20 to 40 wt %. When the content of the polyolefin resin is 10 wt % or more (the content of the plasticizer is 90 wt % or less), swelling and neck-in are suppressed at the die exit at the time of molding into a sheet shape, ensuring sheet moldability, and the membrane production properties are stabilized. On the other hand, when the content of the polyolefin resin is 50 wt % or less (the content of the plasticizer is 50 wt % or more), shrinkage in the thickness direction does not increase, and the molding processability is stabilized.

From the viewpoint of successfully dispersing polyethylene in the extrudate, the plasticizer is preferably added in two or more places. Assuming the amount of the plasticizer added is 100 wt %, the ratio of addition on the upstream side is preferably 50 to 95 wt %. When the ratio of addition on the upstream side is 95 wt % or less, the resin after the addition is not too soft and is imparted with a proper thrust, and the discharge stability is improved. When the ratio of addition on the upstream side exceeds 50 wt %, the resin is not too hard and is easily kneaded. The ratio of addition on the upstream side is more preferably 50 to 90 wt %, because both discharge stability and kneadability can be satisfied. By appropriately changing the ratio of addition within the range above according to the solubility or viscosity (molecular weight) of the resin used, good dispersibility is obtained. When the liquid adding position (the position at which the plasticizer is added) is provided in a plurality of places, reduction in the screw temperature can be suppressed and since sufficient heat quantity necessary to dissolve the resin is thereby obtained, HDPE having a low melting point is prevented from first dissolving too much, as a result, uniform kneadability is obtained.

From the viewpoint of obtaining good processability-kneadability and dispersibility and distributivity of resin, the ratio (L/D) of length (L) to diameter (D) of a screw of the twin-screw extruder is preferably 20 to 100, more preferably 35 to 70. When L/D is 20 or more, sufficient melt-kneading is obtained. When L/D is 100 or less, the residence time of the polyolefin solution does not excessively increase. From the viewpoint of obtaining good dispersibility and distributivity while preventing deterioration of the resin kneaded, the inner diameter of a cylinder of the twin-screw extruder is preferably 40 mm to 100 mm.

To successfully disperse polyethylene in the extrudate to thereby obtain excellent thickness uniformity of the microporous membrane, the screw rotational speed (Ns) of the twin-screw extruder is preferably set to be 300 to 600 rpm. Furthermore, the ratio Q/Ns of the extrusion quantity Q (kg/h) of a polyolefin solution to Ns (rpm) is preferably set to be 0.01 kg/h/rpm or more and 2.5 kg/h/rpm or less. Q/Ns is more preferably more than 0.05 kg/h/rpm but 2.0 kg/h/rpm or less. As the value of Q/Ns is smaller, the resin kneadability increases, and a uniform solution is thereby obtained, but deterioration of the resin is promoted due to large shear heating. A low-molecular-weight component is therefore accumulated in the bled-out plasticizer and attaches to the sheet, leading to deterioration of the outer appearance. If the value of Q/Ns is large, resin deterioration may be suppressed, but kneadability is insufficient, and a uniform solution is not obtained. Accordingly, Q/Ns is appropriately changed within the range above according to the molecular weight or solubility of the resin used, and good (uniformly mixed) solution and outer appearance are thereby obtained.

The heated solution of the melt-kneaded polyolefin resin is extruded through a die, directly or via another extruder, and molded to obtain an extrudate such that the thickness of the final product microporous membrane becomes 5 μm to 100 μm. As the die, a rectangular T-die may be used. In the case of using a T-die, from the viewpoint that the thickness of a final product microporous membrane is easily controlled, the die preferably has a slit gap of 0.1 mm to 5 mm and is preferably heated at 140 to 250° C. during extrusion.

The extrudate obtained is then cooled to form a gel-like sheet, and the microphase of polyethylene separated by the solvent can be fixed through the cooling. In the cooling step, the extrudate is preferably cooled to a temperature of 10 to 45° C. Because the final cooling temperature is preferably not more than the crystallization final temperature and by providing a fine higher-order structure, molecular orientation during the subsequent stretching readily proceeds. For this reason, the cooling is preferably performed at a rate of 30° C./min or more at least until a temperature not more than the gelation temperature. The cooling rate of the gel-like sheet is more preferably a rate of 50° C./min or more. If the cooling rate is less than 30° C./min, the crystallinity rises, and a gel-like sheet suitable for stretching is difficultly formed. In general, when the cooling rate is slow, a relatively large crystal is formed to give a gel-like sheet with a coarse higher-order structure, and the gel structure forming it also becomes large. On the other hand, when the cooling rate is fast, a relatively small crystal is formed to give a gel-like sheet with a dense higher-order structure. If the gel structure becomes dense, the amount of a plasticizer bled-out when the gel-like sheet is bent increases, allowing a low-molecular-weight component, dust or the like to be accumulated in the plasticizer intervening between the sheet and a roll, and the accumulated material attaches to the sheet to cause deterioration of the outer appearance. Accordingly, the sheet needs to be conveyed with as little bending as possible. For this reason, the arc formed by the gel-like sheet when put into contact with a chill roll is preferably smaller.

The cooling method includes, for example, a method of bringing the extrudate into direct contact with cold air, cooling water or other cooling mediums, a method of bringing the extrudate into contact with a roll cooled with a cooling medium, and a method using a casting drum or the like. The solution extruded through a die may be taken up before cooling or during cooling at a take-up ratio of preferably 1 to 10, more preferably 1 to 5. If the take-up ratio is 10 or more, neck-in increases, and rupture is likely to occur during stretching. The thickness of the gel-like sheet is preferably 0.5 mm to 5 mm, more preferably 0.7 mm to 3 mm.

In the foregoing pages, when the microporous membrane is composed of a single layer has been described, but the polyolefin microporous membrane is not limited to a single layer and may also be a multilayer laminate. Each layer of the laminated portion may contain a desired resin, in addition to polyethylene, as described above, to the extent that the desired effects are not impaired. As the method of forming the polyolefin microporous membrane as a multilayer laminate, a conventional method may be used, but there is, for example, a method where desired resins are prepared as needed, separately supplied to extruders, melted at a desired temperature, joined in a polymer tube or a die, and extruded through a slit die each to a desired lamination thickness to thereby form a multilayer laminate.

(c) Sequential Stretching

The obtained gel-like sheet (single-layer or multilayer sheet) is stretched. The stretching is performed at a predetermined stretch ratio by heating the gel-like sheet and using a conventional tenter method or roll method or a combination of these methods. The production direction of the gel-like sheet is defined as the MD direction (longer direction, longitudinal direction) and the direction of the gel-like sheet perpendicular to the MD direction is defined as the TD direction (width direction, transverse direction). As the stretching, from the viewpoint of imparting excellent strength or transparency, sequential biaxial stretching of stretching the sheet in the MD direction and then stretching the sheet in the TD direction is performed.

The stretch ratio differs depending on the thickness of the gel-like sheet, but the sheet is preferably stretched at a stretch ratio of 5 times or more in each direction. Stretching in the MD direction is preferably performed at a stretch ratio of 5 to 10 times, and stretching in the TD direction is preferably performed at a stretch ratio of 5 to 9 times. The ratio of (stretch ratio in MD direction/stretch ratio in TD direction) is 0.7 or more, preferably 1.0 or more.

The areal stretch ratio is preferably 25 times or more, still more preferably 36 times or more, most preferably 42 times or more. If the areal stretch ratio is less than 25 times, stretching is insufficient, and a high-strength microporous membrane is not obtained. The areal stretch ratio is preferably 150 times or less. If the areal stretch ratio exceeds 150 times, rupture is likely to often occur during production of the microporous membrane, and the productivity lowers.

The stretching temperature in the MD direction is preferably not more than the melting point of the gel-like sheet, more preferably from (crystal dispersion temperature Tcd of polyolefin resin) to (melting point of gel-like sheet). If the stretching temperature exceeds the melting point of the gel-like sheet, the polyolefin resin melts, and a molecular chain cannot be oriented by stretching. If the stretching temperature is less than the crystal dispersion temperature of the polyolefin resin, since high stretching tension is applied particularly in the case of a roll system due to insufficient softening of the polyolefin resin, the sheet may meander on the roll, and stretching at a high stretch ratio cannot be performed. In addition, flow of crystal grains is less likely to occur and, therefore, the pore structure tends to be non-uniformized in the obtained microporous membrane. In performing stretching, the plasticizer sometimes bleeds out to the sheet surface. If the bleed-out amount is increased, a low-molecular-weight component, dust or the like is accumulated in the plasticizer intervening between the sheet and a roll, and the accumulated material attaches to the sheet to cause deterioration of the outer appearance. Even if the plasticizer is not contaminated, when the stretching roll has a portion attached with the plasticizer, temperature unevenness (unevenness in the degree of plasticization effect) is produced, and a stretching difference is created and causes an appearance failure. Accordingly, the bleed-out amount must be controlled. The bleed-out amount is related to the stretching temperature or stretching tension. When the stretching temperature is high, the sheet is sufficiently softened and therefore, the tension necessary for stretching lowers. As the stretching tension is lower, stretching is facilitated, and meandering is less likely to occur. That is, to lower the stretching tension, the stretching temperature is preferably higher, but in reducing the bleed-out amount, it is preferable to lower the stretching temperature.

On the other hand, in the stretching in the TD direction, the stretching temperature is preferably not more than (melting point of gel-like sheet+10° C.), more preferably from (crystal dispersion temperature Tcd of polyolefin resin) to (melting point of gel-like sheet+5° C.). In the stretching in the TD direction, since high orientation has been produced by MD stretching, a high stretching temperature may be used, compared with MD stretching, but if the stretching temperature exceeds (melting point+5° C.), similarly to MD stretching, the polyolefin resin melts, and a molecular chain cannot be oriented by stretching. In addition, the melting may rupture the membrane. If the stretching temperature is less than the crystal dispersion temperature of the polyolefin resin, softening of the polyolefin resin is insufficient and since membrane rupture readily occurs during stretching, stretching at a high stretch ratio cannot be performed.

Specifically, a polyethylene composition has a crystal dispersion temperature of approximately 90 to 100° C. and therefore, the MD stretching temperature is preferably 90 to 125° C., more preferably 90 to 120° C., most preferably 90 to 118° C. The TD stretching temperature is preferably 90 to 130° C., more preferably from 100 to 125° C., most preferably 105 to 120° C. The crystal dispersion temperature Tcd is determined from the temperature characteristics of the dynamic viscoelasticity measured in accordance with ASTM D 4065 or is sometimes determined from NMR.

The higher-order structure formed in the gel sheet is cleaved by the above-described stretching, and the crystal phase is refined, as a result, a large number of fibrils are formed. The fibrils form a three-dimensionally and irregularly connected network structure. Since not only the mechanical strength is enhanced but also fine pores expand, the membrane is suitable for a battery separator.

The sequential stretching must be performed before the plasticizer in the sheet is removed. When the stretching is performed before removal of the plasticizer, since the polyolefin is sufficiently plasticized and in a softened state, the higher-order structure is smoothly cleaved, and the crystal phase can be uniformly refined. In addition, because of ease of cleavage, the strain at the time of stretching is less likely to remain, and the heat shrinkage ratio can be reduced, compared to performing stretching after removal of the plasticizer.

(d) Washing

Next, the solvent remaining in the gel-like sheet is removed using a washing solvent. Since the polyethylene phase and the solvent phase are separated, a microporous membrane is obtained by the removal of the solvent. Examples of the washing solvent include a saturated hydrocarbon such as pentane, hexane and heptane, a chlorinated hydrocarbon such as methylene chloride and carbon tetrachloride, ethers such as diethyl ether and dioxane, ketones such as methyl ethyl ketone, and a chained fluorocarbon such as trifluoroethane. These washing solvents have a low surface tension (for example, 24 mN/m or less at 25° C.). By virtue of using a washing solvent having a low surface tension, the network structure forming micropores is prevented from shrinking due to a surface tension at the gas-liquid interface during drying after washing, and a microporous membrane having porosity and permeability is obtained. These washing solvents are appropriately selected according to the plasticizer and are used individually or as a mixture.

As for the washing method, the washing may be performed, for example, by a method of extracting the plasticizer by immersing the gel-like sheet in a washing solvent, a method of showering a washing solvent on the gel-like sheet, or a method combining these methods. The amount of the washing solvent used varies depending on the washing method but, in general, is preferably 300 parts by weight or more per 100 parts by weight of the gel-like sheet. The washing temperature may be 15 to 30° C. and, if desired, the system is heated to 80° C. or less. At this time, from the viewpoint of increasing the washing effect of the solvent, from the viewpoint of preventing physical properties of the obtained microporous membrane from becoming non-uniform physical properties in the TD direction and/or MD direction of the microporous membrane, and from the viewpoint of enhancing the mechanical properties and electrical properties of the microporous membrane, the time for which the gel-like sheet is immersed in a washing solvent is preferably longer.

The above-described washing is preferably performed until the amount of the residual solvent in the gel-like sheet after washing, i.e., in the microporous membrane, is reduced to less than 1 wt %.

Thereafter, the washing solvent is removed by drying. The drying method is not particularly limited, but the sheet is dried by heat drying, air drying or the like. The drying temperature is preferably not more than the crystal dispersion temperature Tcd of the polyethylene composition, more preferably (Tcd−5° C.) or less. Assuming the dry weight of the microporous membrane is 100 wt %, the drying is preferably performed until the amount of the residual washing solvent is reduced to 5 wt % or less, more preferably 3 wt % or less. If the drying is insufficient, the porosity of the microporous membrane is reduced by the subsequent heat treatment to deteriorate the permeability.

(e) Re-Stretching

The dried microporous membrane may be stretched (re-stretched) in at least a uniaxial direction. Before re-stretching, a desired resin layer may be appropriately provided on the microporous membrane by extrusion lamination, coating or the like.

The re-stretching can be performed, similarly to the above-described stretching, by a tenter method or the like while heating the microporous membrane. The re-stretching may be either uniaxial stretching or biaxial stretching. The biaxial stretching may be either simultaneous biaxial stretching or sequential stretching, but simultaneous biaxial stretching is preferred. Multi-stage stretching is performed by combining simultaneous biaxial or/and sequential stretching.

The re-stretching temperature is preferably not more than the melting point of the polyethylene composition, more preferably from (Tcd−20° C.) to the melting point. Specifically, the re-stretching temperature is preferably 70 to 135° C., more preferably 110 to 132° C., and the re-stretching temperature is most preferably 120 to 130° C.

The stretch ratio of re-stretching is, in uniaxial stretching, preferably 1.01 to 1.6 times, and in particular, the stretch ratio in the TD direction is preferably 1.1 to 1.6 times, more preferably 1.2 to 1.5 times. In biaxial stretching, the stretch ratio is preferably 1.01 to 1.6 times in each of the MD direction and the TD direction. The stretch ratio of re-stretching may differ between the MD direction and the TD direction.

The re-stretching speed is preferably 3%/sec or more, more preferably 5%/sec or more, in both the longitudinal and TD directions. The upper limit of the re-stretching speed is preferably 50%/sec or less and preferably 25%/sec or less. The re-stretching speeds in the MD direction and the TD direction may be set independently of each other.

(f) Heat Relaxation Treatment

The microporous membrane after stretching may be subjected to a heat setting treatment and/or a heat relaxation treatment. The crystals are stabilized by heat setting treatment and heat relaxation treatment, and this makes it possible to manufacture a microporous membrane having a homogenized lamellar layer, a large pore size, and excellent strength. The heat setting treatment is performed in the temperature range from the crystal dispersion temperature to the melting point of the PO resin constituting the microporous membrane. The heat setting treatment is performed by a tenter method, a roll method, or a rolling method.

The heat setting treatment temperature is preferably a re-stretching temperature±5° C., and physical properties are thereby stabilized. The temperature is more preferably the re-stretching temperature±3° C. As the heat relaxation treatment method, a method disclosed, for example, in JP-A-2002-256099 can be utilized.

(g) Other Steps

Furthermore, a hydrophilization treatment may also be applied to the microporous membrane, depending on the intended use. The hydrophilization treatment can be performed by monomer graft, surfactant treatment, corona discharge or the like. The monomer graft is preferably performed after a crosslinking treatment.

In a surfactant treatment, any of a nonionic surfactant, a cationic surfactant, an anionic surfactant, and a zwitterionic surfactant can be used, but a nonionic surfactant is preferred. The microporous membrane is immersed in a solution obtained by dissolving a surfactant in water or a lower alcohol such as methanol, ethanol, or isopropyl alcohol, or the solution is applied to the microporous membrane by a doctor blade method.

If desired, at least one surface of the microporous membrane is subjected to a corona discharge treatment in air, nitrogen, or a mixed atmosphere of carbon dioxide and nitrogen.

(3) Structure and Physical Properties of Polyolefin Microporous Membrane

The polyolefin microporous membrane obtained has the following physical properties.

1) Heat Shrinkage Ratio at 105° C.

The heat shrinkage ratio of the polyolefin microporous membrane after being exposed at a temperature of 105° C. for 8 hours is preferably 10% or less in both the MD direction and the TD direction. When the heat shrinkage ratio is 10% or less, in the case of using the microporous membrane as a lithium battery separator, short-circuiting between electrodes is prevented even if the separator is shrunk at the time of heat generation. The heat shrinkage ratio is preferably 8% or less in both the MD direction and the TD direction.

2) Thickness of Polyolefin Microporous Membrane

The thickness of the polyolefin microporous membrane is 25 μm or less. The thickness of the polyolefin microporous membrane is preferably 20 μm or less, more preferably 15 μm or less. The lower limit of the thickness of the polyolefin microporous membrane is 3 μm or more, preferably 5 μm or more. If the thickness thereof exceeds 25 μm, the thickness of the gel sheet in the initial stage becomes large, and uneven stretching or uneven heat conduction is likely to occur, making it difficult to obtain uniform physical properties.

3) Degree of Permeation Resistance

The upper limit of the degree of permeation resistance of the polyolefin microporous membrane is 400 sec/100 cc, preferably 300 sec/100 cc, more preferably 200 sec/100 cc, and the lower limit thereof is 50 sec/100 cc. When the degree of permeation resistance is 400 sec/100 cc or less, good ion permeability is obtained, and the electric resistance can be reduced. When the degree of permeation resistance is 50 sec/100 cc or more, good strength is obtained.

4) Porosity

As for the porosity of the polyolefin microporous membrane, in view of membrane strength, the upper limit thereof is preferably 70%, more preferably 60%, still more preferably 50%. Also, in view of permeation performance and electrolyte content, the lower limit of the porosity is 30%, preferably 35%, more preferably 40%. When the porosity is in the range above, the balance of permeability, strength and electrolyte content is improved, the non-uniformity of battery reaction is eliminated, and formation of dendrites is suppressed. As a result, good safety, strength and permeability are obtained.

5) Puncture Strength

The puncture strength of the polyolefin microporous membrane is preferably 450 gf/20 μm (4.41 N/20 μm) or more. When the puncture strength thereof is 450 gf/20 μm or more, generation of a pinhole or a crack due to piercing of the microporous membrane by a sharp part of an electrode material can be inhibited, and the percent defective at the time of assembling of a battery can be reduced. If the puncture strength is less than 450 gf/20 μm, when the polyolefin microporous membrane is incorporated as a separator into a battery, short-circuiting of the electrodes may be caused.

6) Shutdown Temperature (SDT), Meltdown Temperature (MDT)

The shutdown temperature of the polyolefin microporous membrane is preferably 130 to 145° C. If the shutdown temperature thereof is less than 130° C., meltdown occurs at a low temperature, and this is sometimes unfavorable from the safety aspect. If the shutdown temperature thereof exceeds 145° C., a sufficient safety function at high temperatures cannot be expected disadvantageously in some cases.

From the viewpoint of ensuring safety of a battery, the meltdown temperature of the polyolefin microporous membrane is preferably 150° C. or more.

(4) Measurement Method of Physical Properties

The method of measuring each physical property is described below.

1. Measurement of Molecular Weight Distribution of Polyolefin

Measurement of the molecular weight distribution of polyolefin (measurements of weight average molecular weight, molecular weight distribution, content of prescribed component and the like) was performed by high-temperature GPC. The measurement conditions were as follows:

Instrument: high-temperature GPC apparatus (Machine No. HT-GPC, manufactured by Polymer Laboratories, PL-220)
Detector: Differential refractometer detector RI
Guard column: Shodex G-HT
Column: Shodex HT806M (two columns) ($\phi$: 7.8 mm×30 cm, manufactured by Showa Denko K.K.)
Solvent: 1,2,4-trichlorobenzene (TCB, produced by Wako Pure Chemical Industries, Ltd.) (added with 0.1% BHT)
Flow velocity: 1.0 mL/min
Column temperature: 145° C.
Preparation of sample: A measurement solvent (5 mL) was added to 5 mg of a sample and after heating and stirring for about 30 minutes at 160 to 170° C., the obtained solution was filtrated through a metal filter (pore size: 0.5 μm).
Injection volume: 0.200 mL
Standard sample: monodisperse polystyrene (produced by Tosoh Corporation)
Data processing: GPC data processing system, manufactured by TRC 2. Membrane Thickness The thickness of the microporous membrane was measured at randomly selected MD positions by using a contact thickness meter. The measurement was performed at intervals of 5 mm over a distance of 30 cm at points along TD (width) of the membrane. The measurement along TD was performed five times, and the arithmetic average thereof was defined as the thickness of the sample.

3. Degree of Permeation Resistance

The degree of permeation resistance P1 was measured on a microporous membrane having a membrane thickness T1 by a permeability meter (EGO-1T, manufactured by Asahi Seiko Co., Ltd.), and the degree of permeation resistance P2 when setting the membrane thickness to 20 μm was calculated according to the formula: $P2=(P1\times20)/T1$.

4. Puncture Strength

A microporous membrane having an average membrane thickness T1 (μm) was pierced by a needle of 1 mm in diameter having a spherical tip (radius of curvature R: 0.5 mm) at a rate of 2 mm/sec, and the maximum load L1 (the load immediately before penetration, unit: gf) was measured. The puncture strength L2 (gf/20 μm) when setting the membrane thickness to 20 μm was calculated according to the formula: $L2=(L1\times20)/T1$.

5. Porosity

The porosity was calculated from the mass w1 of a microporous membrane and the mass w2 of a membrane made of the same polyolefin composition as the microporous membrane and free from the same-size pore, according to the formula: porosity $(\%)=(w2-w1)/w2\times100$.

6. Heat Shrinkage Ratio

The shrinkage ratio in the MD direction after holding a microporous membrane at 105° C. for 8 hours was measured three times, and the average value thereof was defined as the heat shrinkage ratio in the MD direction. In addition, the heat shrinkage ratio in the TD direction was determined by performing the same measurement for the TD direction.

7. Tensile Strength

The MD tensile strength and TD tensile strength were measured in conformity with ASTM D882 by using a 10 mm-width strip-shaped test piece.

8. Shutdown and Meltdown Temperatures

Shutdown temperature: The shutdown temperature was measured as a temperature when the degree of permeation resistance was increased to 100,000 seconds/100 cc or more by heating at a predetermined temperature.

Meltdown temperature: The meltdown temperature was measured as a temperature when the membrane melted and ruptured by heating at a predetermined temperature.

9. DSC Measurement

The heat of fusion is determined by a differential scanning calorimeter (DSC). The DSC was performed using a TA Instrument MDSC 2920 or Q1000 Tzero-DSC, and the data was analyzed using a general analysis software.

Liquid paraffin was used as the plasticizer. The liquid paraffin has a boiling point of 300° C. or more, and this is a range that can be regarded as having no endothermic or exothermic reaction at 100 to 120° C. In addition, the resin concentration (the concentration when the mixture of resin and plasticizer was assumed to be 100%) was adjusted to a range where the resin plasticizing effect can be confirmed.

The measurement method was as follows.

A dispersion liquid was prepared by mixing a polymer and a plasticizer to afford a resin concentration of 50 to 60 wt %.

From 20 to 30 mg of the prepared sample was sealed in an aluminum pan.

The sample was heated to 210° C. from 35° C. at a heating rate of 10° C./min.

The obtained data (endothermic quantity ($\delta$H (mH/g))) was analyzed to evaluate the fusion property.

10. Judgment of Outer Appearance of Kneaded Resin

The molten resin extruded from a twin-screw extruder was drawn to prepare three samples, and a solid-like material was confirmed with an eye. The judgment criteria are as follows, and the rating of A or higher poses no practical problem:

A solid-like material was not observed in all of three levels: AA (best).

A solid-like material was not observed in 2/3: A (excellent).

A solid-like material was not observed in 1/3: B (good).

A solid-like material was not observed in 0/3 or the occurrence rate of the solid-like material was extremely high: C (bad).

11. Membrane Production Stability

The production stability was confirmed by performing continuous membrane production of 3,000 m on the condition that the outer appearance is "A" or higher.

The judgment criteria are as follows: "A" poses no practical problem, and "B" or lower may pose a problem in the long-term membrane production.

The membrane was not ruptured, and the outer appearance of film was not changed: A (excellent).

The membrane could be produced without membrane rupture: B (good).

The membrane ruptured: C (failed).

EXAMPLE 1

As the resin composition, a high-density polyethylene (primary material A) having a weight average molecular weight of $3.6 \times 10^5$ and an average particle diameter of 135 μm and an ultrahigh molecular weight polyethylene (secondary material A) having a weight average molecular weight of $2.4 \times 10^6$ and an average particle diameter of 165 μm were used in a proportion of 82 wt % and 18 wt %, respectively. As the diluent, liquid paraffin having a kinetic viscosity of 200 cSt at 40° C. was used. A sheet composition in which the resin composition above and the plasticizer were used in a mass composition ratio of 25:75 by weight, was kneaded at 180° C., extruded and molded using a twin-screw extruder having a T-die, which was set to provide a ratio of liquid paraffin additions (upstream:downstream) of 9:1 and Q/Ns of 0.8, and a sheet was produced using a casting roll set at 35° C. The sheet was preheated for 70 seconds by a preheating roll including 6 rolls and set at a temperature of 116° C. At this time, the rotational speed of a motor directly connected to the rollers was controlled to produce a speed difference of 1% between respective rollers and provide a higher peripheral velocity closer to the downstream side. The stretching roll included 4 rolls and set at a temperature of 116° C., and the stretching was performed to give a stretch ratio of 6.5 times. The stretching was performed so that a maximum strain rate was 300%/sec and a final film traveling speed was 30 m/min. Cooling was performed for 7 seconds by a cooling roll including 3 rolls and set at a temperature of 60° C. and rotating at the same rate as the final stretching roll. The resulting stretched sheet was gripped at both end parts with clips and after transverse stretching at a stretch ratio of 6.5 times and a temperature of 120° C. in an oven and cooling to 30° C., the biaxially stretched film was washed in a methylene chloride washing bath adjusted to a temperature of 25° C. to remove the liquid paraffin. The washed membrane was dried in a drying furnace adjusted at 60° C., re-stretched in a re-stretching step to give an areal stretch ratio of 1.2 times in the longitudinal direction×transverse direction, and heat-treated for 20 seconds at a rate of 30.0 m/min and 125° C. to obtain a microporous membrane.

EXAMPLE 2

A membrane was produced under the same conditions as in Example 1 except that the mass composition ratio of the resin composition above and the plasticizer in the sheet composition was set to 30:70 by weight.

EXAMPLE 3

A membrane was produced by the same method as in Example 1 except that the proportions of high-density polyethylene (primary material A) and ultrahigh molecular weight polyethylene (secondary material A) were set to 70 wt % and 30 wt %, respectively, the resin composition above and the plasticizer were used in a mass composition ratio of 28.5:71.5 by weight and kneaded, extruded and molded under conditions providing a ratio of liquid paraffin additions (upstream:downstream) of 8:2 and Q/Ns of 1.5, the longitudinal stretching temperature and stretch ratio were set to 117° C. and 7.6 times, and the transverse stretching temperature and stretch ratio were set to 120° C. and 8.3 times.

EXAMPLE 4

A membrane was produced by the same method as in Example 3 except that the mass composition ratio of the resin composition (primary material A and secondary material A) and the plasticizer was set to 30:70 by weight.

EXAMPLE 5

A membrane was produced by the same method as in Example 4 except that the proportions of high-density polyethylene (primary material A) and ultrahigh molecular weight polyethylene (secondary material A) were set to 60 wt % and 40 wt %, respectively, the resin composition above and the plasticizer were used in a mass composition ratio of 25:75 by weight and kneaded, extruded and molded under conditions providing a ratio of liquid paraffin additions (upstream:downstream) of 7.5:2.5, the longitudinal stretching temperature and stretch ratio were set to 117° C. and 7.6 times, and the transverse stretching temperature and stretch ratio were set to 120° C. and 8.3 times.

EXAMPLE 6

As the resin composition, a high-density polyethylene (primary material A) having a weight average molecular weight of $3.6 \times 10^5$ and an average particle diameter of 135 μm and an ultrahigh molecular weight polyethylene (secondary material B) having a weight average molecular weight of $1.1 \times 10^6$ and an average particle diameter of 160 μm were used in a proportion of 70 wt % and 30 wt %, respectively. As the diluent, liquid paraffin having a kinetic viscosity of 200 cSt at 40° C. was used. A sheet composition using the resin composition above and the plasticizer in a mass composition ratio of 28.5:71.5 by weight was kneaded at 180° C. and extruded by using and setting a twin-screw extruder having a T-die to provide a ratio of liquid paraffin additions (upstream:downstream) of 7.5:2.5 and Q/Ns of 0.8, and the resulting resin was drawn to confirm the presence or absence of a solid-like material in the kneaded resin.

EXAMPLE 7

A high-density polyethylene (primary material A) having a weight average molecular weight of $3.6 \times 10^5$ and an average particle diameter of 135 μm and an ultrahigh molecular weight polyethylene (secondary material B) having a weight average molecular weight of $1.1 \times 10^6$ and an average particle diameter of 160 μm were used in a proportion of 60 wt % and 40 wt %, respectively. The presence or absence of a solid-like material in the kneaded resin was confirmed by the same method as in Example 5 except that the mass composition ratio of the resin composition above and the plasticizer in the sheet composition was set to 25:75 by weight.

EXAMPLE 8

The presence or absence of a solid-like material in the kneaded resin was confirmed by performing kneading under the same conditions as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material E) having a weight average molecular weight of $3.3 \times 10^6$ and an average particle diameter of 90 μm were used in a proportion of 70 wt % and 30 wt %, respectively, the mass composition ratio of the resin composition above and the plasticizer was set to 28.5:71.5 by weight, and Q/Ns was set to 0.6.

EXAMPLE 9

The presence or absence of a solid-like material in the kneaded resin was confirmed under the same conditions as in Example 8 except that the kneading temperature of the twin-screw extruder was set to 200° C.

EXAMPLE 10

The presence or absence of a solid-like material in the kneaded resin was confirmed by performing kneading under the same conditions as in Example 6 except that, as the resin composition, a high-density polyethylene (primary material B) having a weight average molecular weight of $4.3 \times 10^5$ and an average particle diameter of 105 μm and an ultrahigh molecular weight polyethylene (secondary material A) having a weight average molecular weight of $2.4 \times 10^6$ and an average particle diameter of 165 μm were used in a proportion of 82 wt % and 18 wt %, respectively, the mass composition ratio of the resin composition above and the plasticizer was set to 25:75 by weight.

EXAMPLE 11

The presence or absence of a solid-like material in the kneaded resin was confirmed by performing kneading under the same conditions as in Example 10 except that, as the resin composition, a high-density polyethylene (primary material B) having a weight average molecular weight of $4.3 \times 10^5$ and an average particle diameter of 105 μm and an ultrahigh molecular weight polyethylene (secondary material A) having a weight average molecular weight of $2.4 \times 10^6$ and an average particle diameter of 165 μm were used in a proportion of 70 wt % and 30 wt %, respectively, the mass composition ratio of the resin composition above and the plasticizer was set to 25:75 by weight.

EXAMPLE 12

The presence or absence of a solid-like material in the kneaded resin was confirmed by performing kneading under the same conditions as in Example 10 except that a high-density polyethylene (primary material B) having a weight average molecular weight of $4.3 \times 10^5$ and an average particle diameter of 105 μm and an ultrahigh molecular weight polyethylene (secondary material A) having a weight average molecular weight of $2.4 \times 10^6$ and an average particle diameter of 165 μm were used in a proportion of 60 wt % and 40 wt %, respectively, and the mass composition ratio of the resin composition above and the plasticizer was set to 25:75 by weight.

EXAMPLE 13

The presence or absence of a solid-like material in the kneaded resin was confirmed by performing kneading under the same conditions as in Example 10 except that, as the resin composition, a high-density polyethylene (primary material C) having a weight average molecular weight of $5.0 \times 10^5$ and an average particle diameter of 130 μm and an ultrahigh molecular weight polyethylene (secondary material A) having a weight average molecular weight of $2.4 \times 10^6$ and an average particle diameter of 165 μm were used in a proportion of 82 wt % and 18 wt %, respectively, and the mass composition ratio of the resin composition above and the plasticizer was set to 25:75 by weight.

EXAMPLE 14

The presence or absence of a solid-like material in the kneaded resin was confirmed by performing kneading under the same conditions as in Example 10 except that, as the resin composition, a high-density polyethylene (primary material C) having a weight average molecular weight of $5.0 \times 10^5$ and an average particle diameter of 130 μm and an ultrahigh molecular weight polyethylene (secondary material A) having a weight average molecular weight of $2.4 \times 10^6$ and an average particle diameter of 165 μm were used in a proportion of 70 wt % and 30 wt %, respectively, and the mass composition ratio of the resin composition above and the plasticizer was set to 25:75 by weight.

EXAMPLE 15

The presence or absence of a solid-like material in the kneaded resin was confirmed by performing kneading under the same conditions as in Example 10 except that, as the resin composition, a high-density polyethylene (primary material C) having a weight average molecular weight of $5.0 \times 10^5$ and an average particle diameter of 130 μm and an ultrahigh molecular weight polyethylene (secondary material A) having a weight average molecular weight of $2.4 \times 10^6$ and an average particle diameter of 165 μm were used in a proportion of 60 wt % and 40 wt %, respectively, and the mass composition ratio of the resin composition above and the plasticizer was set to 25:75 by weight.

EXAMPLE 16

The presence or absence of a solid-like material in the kneaded resin was confirmed by performing kneading under the same conditions as in Example 15 except that, as the resin composition, a high-density polyethylene (primary material C) having a weight average molecular weight of $5.0 \times 10^5$ and an average particle diameter of 130 μm and an ultrahigh molecular weight polyethylene (secondary material B) having a weight average molecular weight of $1.1 \times 10^6$ and an average particle diameter of 160 μm were used in a proportion of 70 wt % and 30 wt %, respectively, the resin composition above and the plasticizer were used in a mass composition ratio of 28.5:71.5 by weight, and the ratio of liquid paraffin additions (upstream:downstream) was set to 5:5.

COMPARATIVE EXAMPLE 1

A membrane was produced by the same method as in Example 1 except that, as the resin composition, a high-density polyethylene (primary material A) having a weight average molecular weight of $3.6 \times 10^5$ and an average particle diameter of 135 μm and an ultrahigh molecular weight polyethylene (secondary material A) having a weight average molecular weight of $2.4 \times 10^6$ and an average particle diameter of 165 μm were used in a proportion of 98 wt % and 2 wt %, respectively, the resin composition above and the plasticizer were used in a mass composition ratio of 25:75 by weight and kneaded, extruded and molded under conditions providing a ratio of liquid paraffin additions (upstream:downstream) of 9:1 and Q/Ns of 0.6, the longitudinal stretching temperature and stretch ratio were set to 116° C. and 7.0 times, and the transverse stretching temperature and stretch ratio were set to 116° C. and 7.0 times.

COMPARATIVE EXAMPLE 2

The presence or absence of a solid-like material in the kneaded resin was confirmed by the same method as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material A) having a weight average molecular weight of $2.4 \times 10^6$ and an average particle diameter of 165 μm were used in a proportion of 98 wt % and 2 wt %, respectively, and the resin composition above and the plasticizer were used in a mass composition ratio of 30:70 by weight and kneaded under conditions providing a ratio of liquid paraffin additions (upstream:downstream) of 9:1 and Q/Ns of 0.6.

COMPARATIVE EXAMPLE 3

The presence or absence of a solid-like material in the kneaded resin was confirmed by the same method as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material A) having a weight average molecular weight of $2.4 \times 10^6$ and an average particle diameter of 165 μm were used in a proportion of 70 wt % and 30 wt %, respectively, and the resin composition above and the plasticizer were used in a mass composition ratio of 30:70 by weight and kneaded under conditions providing a ratio of liquid paraffin additions (upstream:downstream) of 10:0 and Q/Ns of 1.5.

COMPARATIVE EXAMPLE 4

The presence or absence of a solid-like material in the kneaded resin was confirmed by the same method as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material A) having a weight average molecular weight of $2.4 \times 10^6$ and an average particle diameter of 165 μm were used in a proportion of 70 wt % and 30 wt %, respectively, and the resin composition above and the plasticizer were used in a mass composition ratio of 30:70 by weight and kneaded under conditions providing a ratio of liquid paraffin additions (upstream:downstream) of 5:5.

COMPARATIVE EXAMPLE 5

The presence or absence of a solid-like material in the kneaded resin was confirmed by the same method as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material C) having a weight average molecular weight of $5.3 \times 10^6$ and an average particle diameter of 60 μm were used in a proportion of 70 wt % and 30 wt %, respectively, and the resin composition above and the plasticizer were used in a mass composition ratio of 28.5:71.5 by weight.

COMPARATIVE EXAMPLE 6

The presence or absence of a solid-like material in the kneaded resin was confirmed by the same method as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material D) having a weight average molecular weight of $2.4 \times 10^6$ and an average particle diameter of 60 μm were used in a proportion of 70 wt % and 30 wt %, respectively, and the resin composition above and the plasticizer were used in a mass composition ratio of 28.5:71.5 by weight.

COMPARATIVE EXAMPLE 7

The presence or absence of a solid-like material in the kneaded resin was confirmed by the same method as in Example 6 except that, as the resin composition, a high-density polyethylene (primary material A) having a weight average molecular weight of $3.6 \times 10^5$ and an average particle diameter of 135 μm and an ultrahigh molecular weight polyethylene (secondary material E) having a weight average molecular weight of $3.3 \times 10^6$ and an average particle diameter of 90 μm were used in a proportion of 70 wt % and 30 wt %, respectively, and the resin composition above and the plasticizer were used in a mass composition ratio of 28.5:71.5 by weight.

COMPARATIVE EXAMPLE 8

The presence or absence of a solid-like material in the kneaded resin was confirmed by the same method as in Example 9 except that, as the resin composition, a high-density polyethylene (primary material A) having a weight average molecular weight of $3.6 \times 10^5$ and an average particle diameter of 135 μm and an ultrahigh molecular weight polyethylene (secondary material F) having a weight average molecular weight of $4.3 \times 10^6$ and an average particle diameter of 90 μm were used in a proportion of 70 wt % and 30 wt %, respectively, and the resin composition above and the plasticizer were used in a mass composition ratio of 28.5:71.5 by weight.

COMPARATIVE EXAMPLE 9

A membrane was produced by the same method as in Example 1 except that, as the resin composition, a high-density polyethylene (primary material A) having a weight average molecular weight of $3.6 \times 10^5$ and an average particle diameter of 135 μm was used, liquid paraffin having a kinetic viscosity of 200 cSt at 40° C. was used as the diluent, the resin composition above and the plasticizer were used as the sheet composition in a mass composition ratio of 40:60 by weight and kneaded, extruded and molded by a twin-screw extruder having a T-die under conditions providing a ratio of liquid paraffin additions (upstream:downstream) of 8:2 and Q/Ns of 0.8, the longitudinal stretching temperature and stretch ratio were set to 117° C. and 7.0 times, and the transverse stretching temperature and stretch ratio were set to 118° C. and 7.0 times.

FIGS. 1 to 6 illustrate graphs showing the ratio of endothermic quantity Q2 to endothermic quantity Q1 (endothermic quantity Q2/endothermic quantity Q1), when the endothermic quantity of a mixture of the primary material and the plasticizer and the endothermic quantity of a mixture of the secondary material and the plasticizer are denoted as Q1 and Q2, respectively. Primary material A is the primary material used in Example 1, primary material B is the primary material used in Example 10, and primary material C is the primary material used in Example 13. Secondary materials A, B, C and D are the secondary materials used in Example 1, Example 6, Comparative Example 5, and Comparative Example 6, respectively.

In Table 4, with respect to the primary material (A to C) and secondary material (A to F) used in Examples 1 to 15 and Comparative Examples 1 to 9, integral values of the endothermic quantity (δH (mH/g)) observed in steps of 0.1° C. in the range of 110 to 118° C. are shown.

Figure 7:
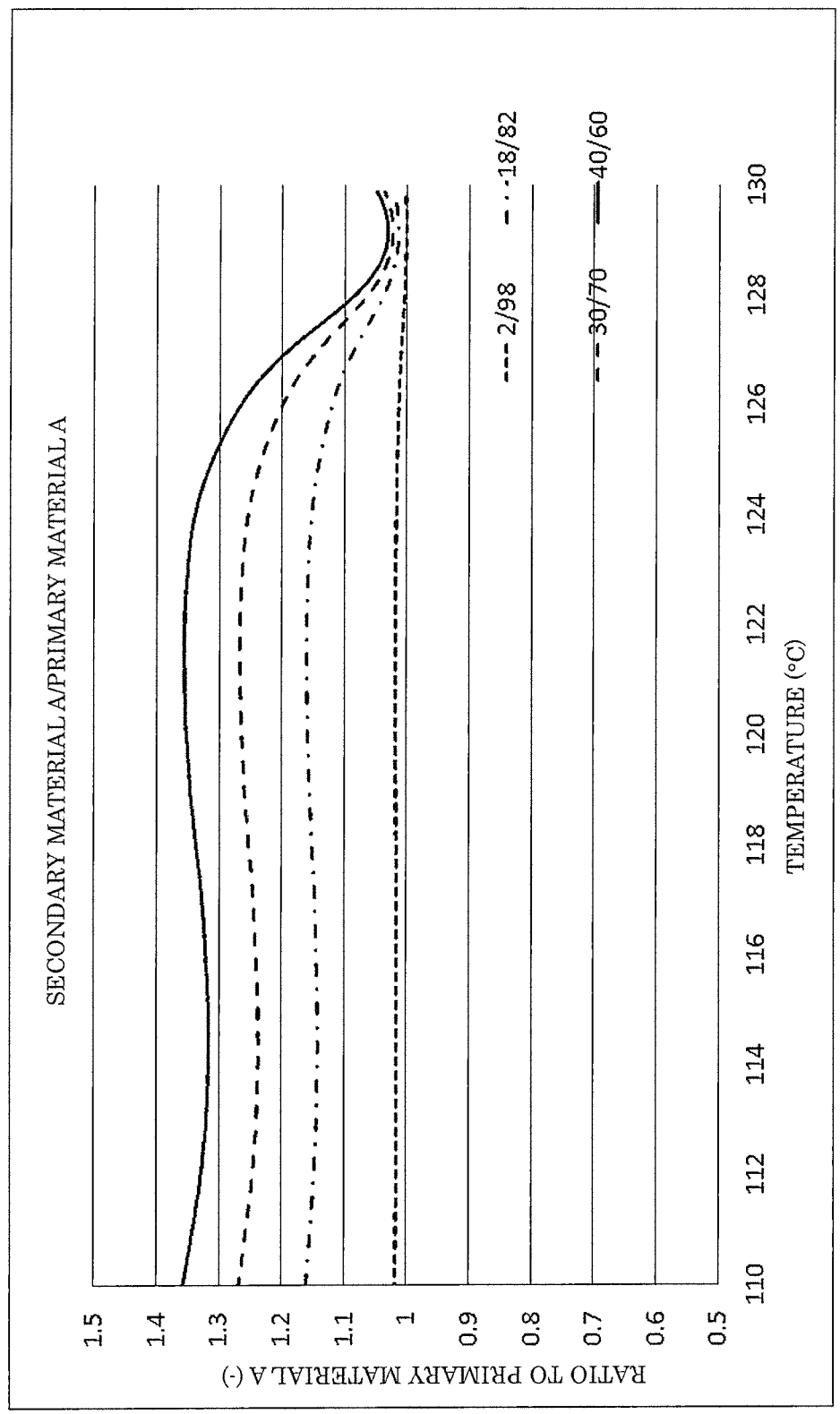
FIG. 7 is a characteristic diagram showing experimental results obtained.
Figure 8:
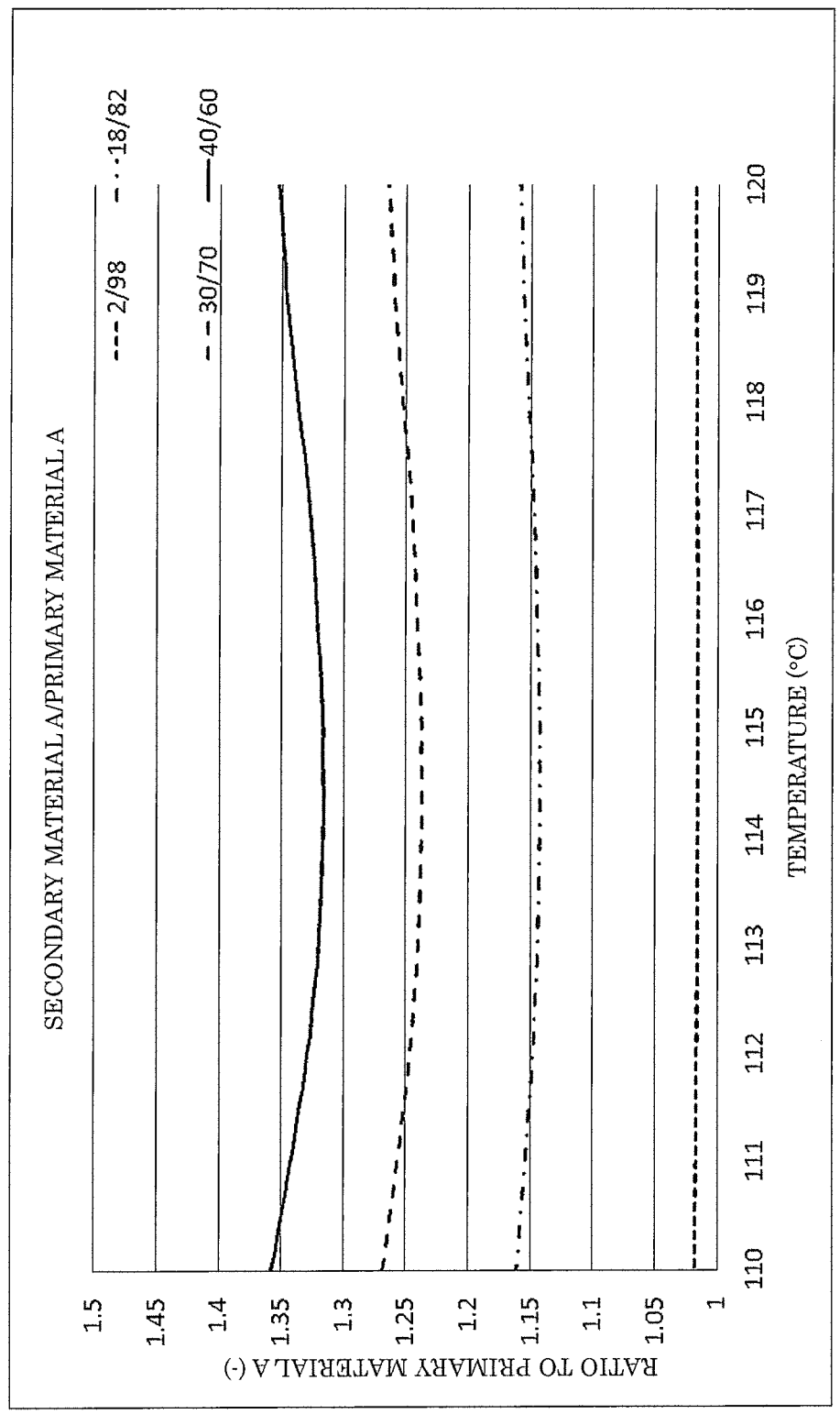
FIG. 8 is a characteristic diagram enlarging a part of FIG. 7.
Figure 9:
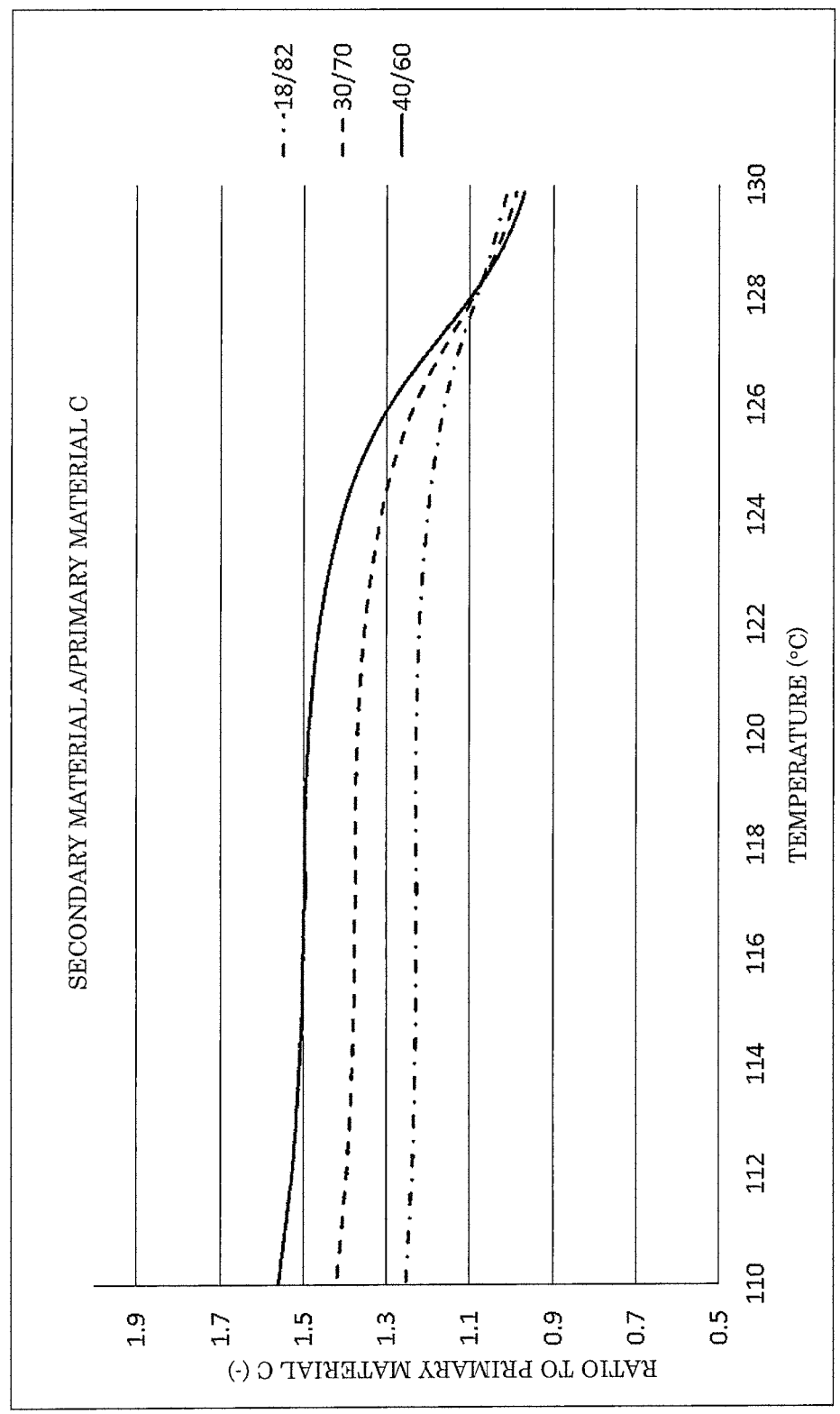
FIG. 9 is a characteristic diagram showing experimental results obtained.
Figure 10:
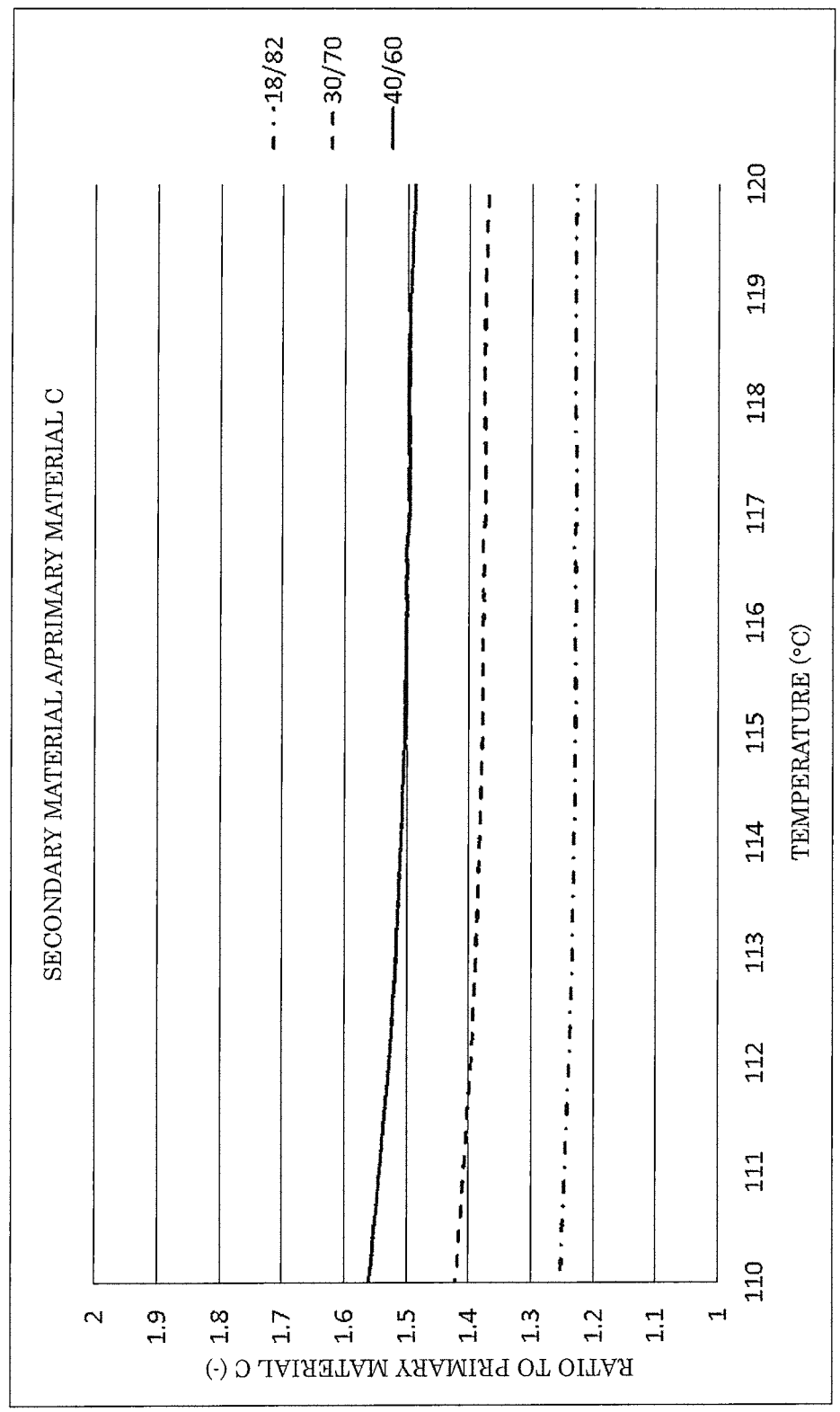
FIG. 10 is a characteristic diagram enlarging a part of FIG. 9.
Figure 11:
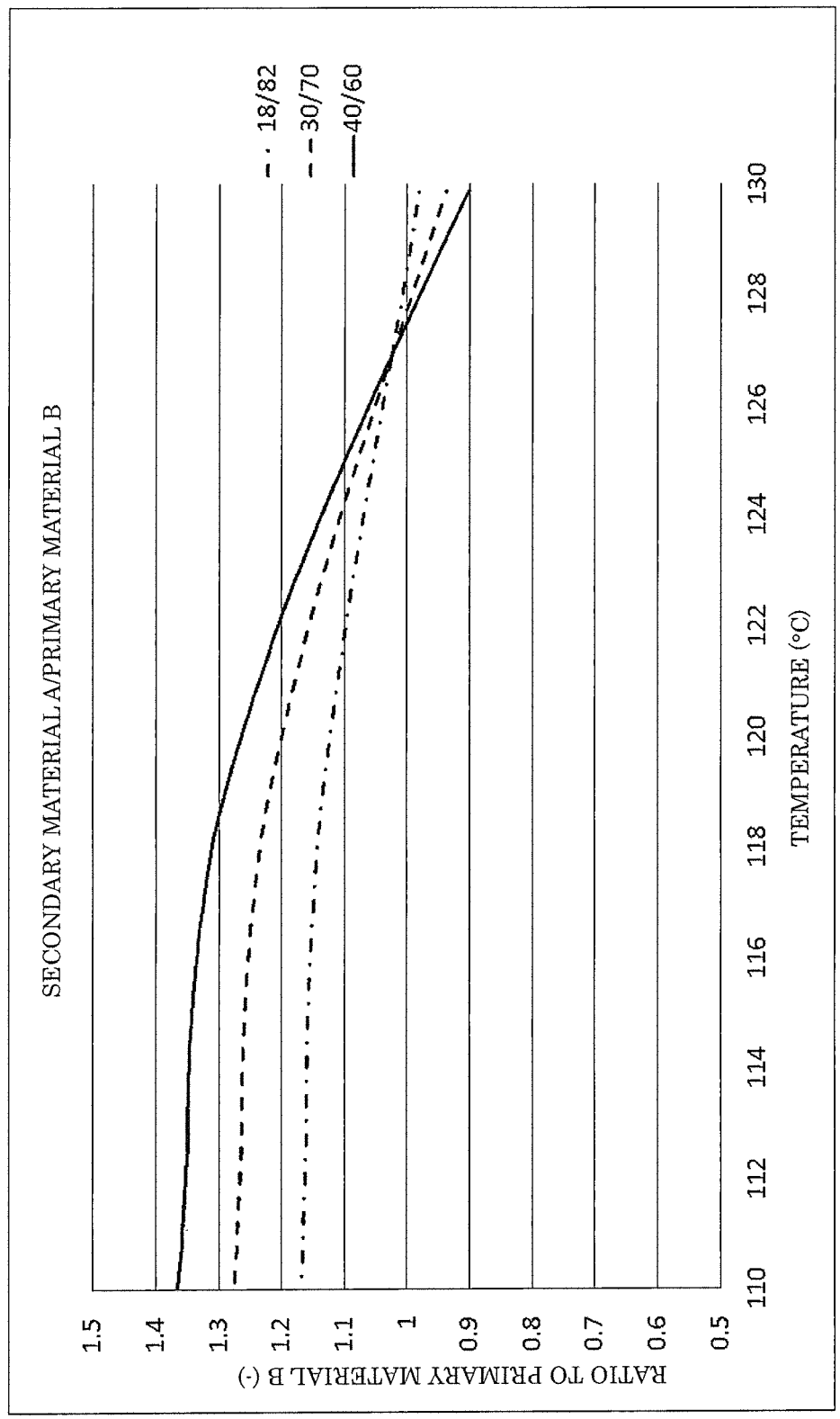
FIG. 11 is a characteristic diagram showing experimental results obtained.
Figure 12:
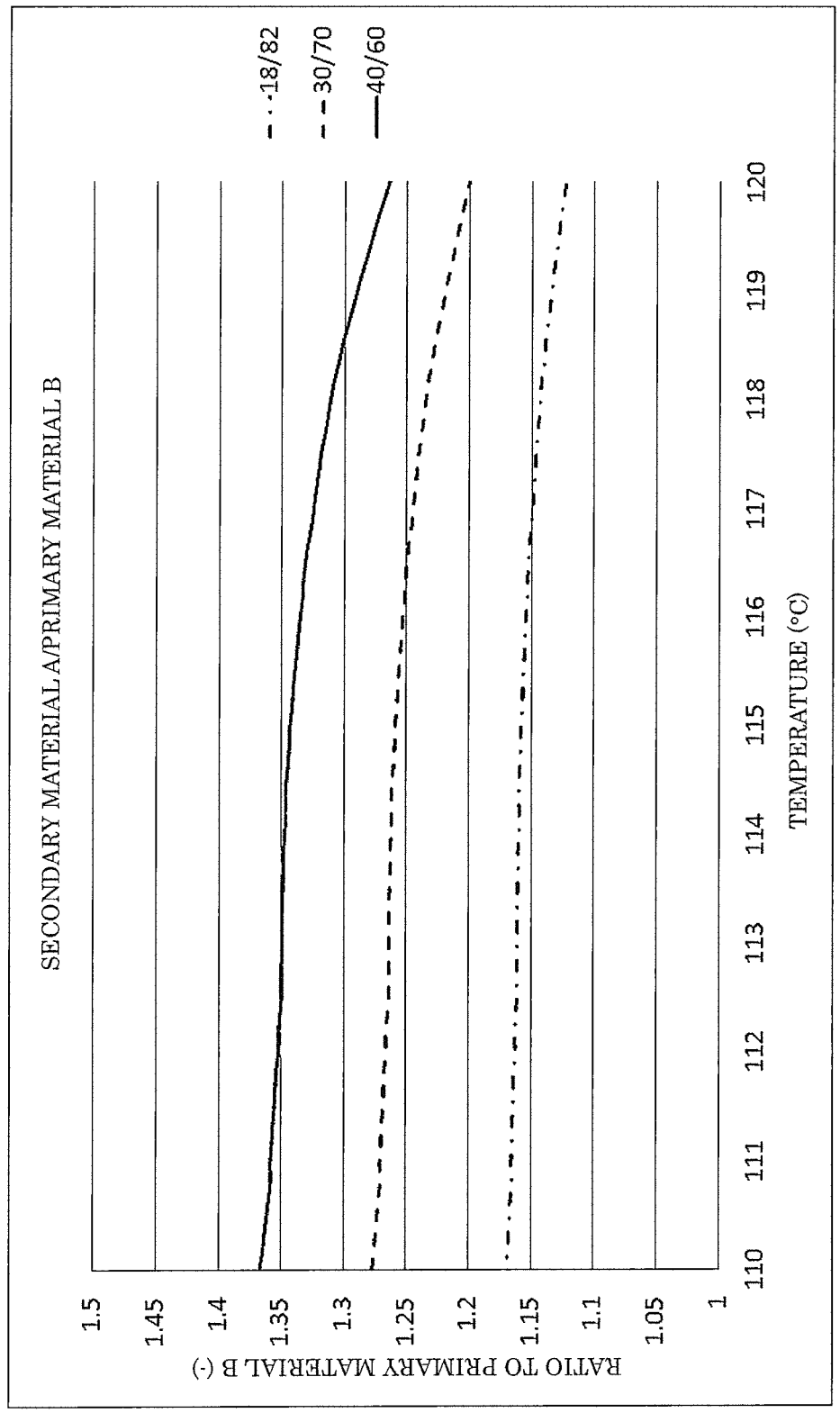
FIG. 12 is a characteristic diagram enlarging a part of FIG. 11.

FIGS. 7 to 12 illustrate graphs showing the ratio of endothermic quantity Q3 of a mixture of the primary material, the secondary material and the plasticizer to endothermic quantity Q1 of a mixture of the primary material and the plasticizer (endothermic quantity Q3/endothermic quantity Q1). FIGS. 7 and 8 relate to the resins used in Examples 1, 3 and 5 and Comparative Example 1. FIGS. 9 and 10 relate to the resins used in Examples 13, 14 and 15, and FIGS. 11 and 12 relate to the resins used in Examples 10, 11 and 12.

In Tables 5 and 6, with respect to the resin mixtures used in Examples above, the integral values of the endothermic quantity observed in steps of 0.1° C. in the range of 110 to 120° C. are shown.

In Table 7, the values obtained by normalizing the integral value shown in Tables 4 to 6 by the integral value of each primary material are shown. When the primary material and the secondary material are combined to provide an endothermic quantity ratio of 1.0 or more in the range of 110 to 118° C., good kneadability is obtained. When the resins are used in a ratio providing an endothermic quantity ratio of 1.1 in the range of 110 to 120° C., good kneadability is obtained.

The resin composition, membrane production conditions and physical properties of each of the polyolefin microporous membranes obtained in Examples 1 to 16 and Comparative Examples 1 to 9 are shown in Tables 1 to 3.

TABLE 1

| | | Example 1 | Example 2 | Example 3 | Example 4 | Example 5 | Example 6 | Example 7 | Example 8 |
|---|---|---|---|---|---|---|---|---|---|
| | Composition UHPE/HDPE/resin conc. | 18/82/25 | 18/82/30 | 30/70/28.5 | 30/70/30 | 40/60/25 | 30/70/28.5 | 40/60/25 | 30/70/28.5 |
| Resin | Molecular weight Mw ($\times 10^6$) | 2.4 | 2.4 | 2.4 | 2.4 | 2.4 | 1.1 | 1.1 | 3.3 |
| | Average particle diameter (μm) | 165 | 165 | 165 | 165 | 165 | 160 | 160 | 90 |
| | Molecular weight Mw ($\times 10^5$) | 3.6 | 3.6 | 3.6 | 3.6 | 3.6 | 3.6 | 3.6 | 3.6 |
| | Average particle diameter (μm) | 135 | 135 | 135 | 135 | 135 | 135 | 135 | 135 |
| | Average particle diameter ratio (HDPE/UHPE) | 0.82 | 0.82 | 0.82 | 0.82 | 0.82 | 0.84 | 0.84 | 1.50 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Membrane production conditions | Ratio of liquid additions (upstream/downstream) | 9:1 | 9:1 | 8:2 | 8:2 | 7.5:2.5 | 7.5:2.5 | 7.5:2.5 | 7.5:2.5 |
|  | Kneading temperature (° C.) | 180 | 180 | 180 | 180 | 180 | 180 | 180 | 180 |
|  | Q/Ns | 0.8 | 0.8 | 1.5 | 1.5 | 1.5 | 0.8 | 0.8 | 0.6 |
|  | MD Stretching temperature (° C.) | 116 | 116 | 117 | 117 | 117 | — | — | — |
|  | MD Stretch ratio (times) | 6.5 | 6.5 | 7.6 | 7.6 | 7.6 | — | — | — |
|  | TD Stretching temperature (° C.) | 120 | 120 | 120 | 120 | 120 | — | — | — |
|  | TD stretch ratio (times) | 6.5 | 6.5 | 8.3 | 8.3 | 8.3 | — | — | — |
| Membrane production properties | Outer appearance of kneaded resin | A | A | AA | AA | AA | A | A | A |
|  | Membrane production property | A | A | A | A | A | — | — | — |
| Physical properties | Membrane thickness (μm) | 11 | 11 | 12 | 12 | 12 | — | — | — |
|  | Permeability (sec/100 cc) | 100 | 110 | 165 | 185 | 170 | — | — | — |
|  | Strength (gf/20 μm) | 400 | 450 | 570 | 610 | 600 | — | — | — |
|  | Heat shrinkage ratio @105° C./8 h, MD/TD (%) | 2.0/2.0 | 3.0/4.0 | 4.0/4.5 | 5.0/6.0 | 5.5/6.0 | — | — | — |
|  | SDT (° C.) | 140 | 140 | 140 | 140 | 139 | — | — | — |
|  | MDT (° C.) | 152 | 152 | 151 | 151 | 152 | — | — | — |

TABLE 2

|  |  | Example 9 | Example 10 | Example 11 | Example 12 | Example 13 | Example 14 | Example 15 | Example 16 |
|---|---|---|---|---|---|---|---|---|---|
|  | Composition, UHPE/HDPE/resin conc. | 30/70/28.5 | 18/82/25 | 30/70/25 | 40/60/25 | 18/82/25 | 30/70/25 | 40/60/25 | 30/70/28.5 |
| UHPE | Molecular weight Mw (×10$^6$) | 3.3 | 2.4 | 2.4 | 2.4 | 2.4 | 2.4 | 2.4 | 1.1 |
|  | Average particle diameter (μm) | 90 | 165 | 165 | 165 | 165 | 165 | 165 | 160 |
| HDPE | Molecular weight Mw (×10$^5$) | 3.6 | 4.3 | 4.3 | 4.3 | 5 | 5 | 5 | 5 |
|  | Average particle diameter (μm) | 135 | 105 | 105 | 105 | 130 | 130 | 130 | 130 |
|  | Average particle diameter ratio (HDPE/UHPE) | 1.50 | 0.64 | 0.64 | 0.64 | 0.79 | 0.79 | 0.79 | 0.81 |
| Membrane production conditions | Ratio of liquid additions (upstream/downstream) | 7.5:2.5 | 7.5:2.5 | 7.5:2.5 | 7.5:2.5 | 7.5:2.5 | 7.5:2.5 | 7.5:2.5 | 5:5 |
|  | Kneading temperature (° C.) | 200 | 180 | 180 | 180 | 180 | 180 | 180 | 180 |
|  | Q/Ns | 0.6 | 0.8 | 0.8 | 0.8 | 0.8 | 0.8 | 1.5 | 1.5 |
|  | MD Stretching temperature (° C.) | — | — | — | — | — | — | — | — |
|  | MD Stretch ratio (times) | — | — | — | — | — | — | — | — |
|  | TD Stretching temperature (° C.) | — | — | — | — | — | — | — | — |
|  | TD Stretch ratio (times) | — | — | — | — | — | — | — | — |
| Membrane production properties | Outer appearance of kneaded resin | A | A | AA | AA | A | AA | AA | A |
|  | Membrane production property | — | — | — | — | — | — | — | — |
| Physical properties | Membrane thickness (μm) | — | — | — | — | — | — | — | — |
|  | Permeability (sec/100 cc) | — | — | — | — | — | — | — | — |
|  | Strength (gf/20 μm) | — | — | — | — | — | — | — | — |
|  | Heat shrinkage ratio @105° C./8 h MD/TD (%) | — | — | — | — | — | — | — | — |
|  | SDT (° C.) | — | — | — | — | — | — | — | — |
|  | MDT (° C.) | — | — | — | — | — | — | — | — |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
|  | Composition UHPE/HDPE/resin conc. | 2/98/25 | 2/98/30 | 30/70/30 | 30/70/30 | 30/70/28.5 | 30/70/28.5 | 30/70/28.5 | 30/70/28.5 | 100/0/40 |
| UHPE | Molecular weight Mw (×10$^6$) | 2.4 | 2.4 | 2.4 | 2.4 | 5.3 | 2.4 | 3.3 | 4.3 | — |
|  | Average particle diameter (μm) | 165 | 165 | 165 | 165 | 60 | 60 | 90 | 90 | 0 |
| HDPE | Molecular weight Mw (×10$^5$) | 3.6 | 3.6 | 3.6 | 3.6 | 3.6 | 3.6 | 3.6 | 3.6 | 3.6 |
|  | Average particle diameter (μm) | 135 | 135 | 135 | 135 | 135 | 135 | 135 | 135 | 135 |
|  | Average particle diameter ratio (HDPE/UHPE) | 0.82 | 0.82 | 0.82 | 0.82 | 2.25 | 2.25 | 1.50 | 1.50 | — |
| Membrane production conditions | Ratio of liquid additions (upstream/downstream) | 9:1 | 9:1 | 10:0 | 5:5 | 7.5:2.5 | 7.5:2.5 | 7.5:2.5 | 7.5:2.5 | 8:2 |
|  | Kneading temperature (° C.) | 180 | 180 | 180 | 180 | 180 | 180 | 180 | 200 | 180 |
|  | Q/Ns | 0.6 | 0.6 | 1.5 | 1.5 | 0.8 | 0.8 | 0.8 | 0.6 | 0.8 |
|  | MD Stretching temperature (° C.) | 116 | — | 117 | 117 | — | — | — | — | 117 |
|  | MD Stretch ratio (times) | 7 | — | 7.6 | 7.6 | — | — | — | — | 7 |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
|  | TD Stretching temperature (° C.) | 116 | — | 120 | 120 | — | — | — | — | 118 |
|  | TD Stretch ratio (times) | 7 | — | 8.3 | 8.3 | — | — | — | — | 7 |
| Membrane production properties | Outer appearance of kneaded resin | B | C | C | C | C | C | B | C | AA |
|  | Membrane production property | C | — | — | — | — | — | — | — | A |
| Physical properties | Membrane thickness (μm) | — | — | 12 | 12 | — | — | — | — | 12 |
|  | Permeability (sec/100 cc) | — | — | — | — | — | — | — | — | 180 |
|  | Strength (gf/20 μm) | — | — | — | — | — | — | — | — | 400 |
|  | Heat shrinkage ratio @105° C./8 h MD/TD (%) | — | — | — | — | — | — | — | — | 2.0/2.0 |
|  | SDT (° C.) | — | — | — | — | — | — | — | — | 138 |
|  | MDT (° C.) | — | — | — | — | — | — | — | — | 148 |

TABLE 4

|  | Secondary Material | | | | | | Primary Material | | |
|---|---|---|---|---|---|---|---|---|---|
| Molecular weight Mw (×10$^5$) | 24 | 11 | 53 | 24 | 33 | 43 | 3.6 | 4.3 | 5.0 |
| Average particle diameter (μm) | 165 | 160 | 60 | 60 | 90 | 90 | 135 | 105 | 130 |
| Endothermic quantity in range of 110 to 118° C. (δH (mH/g)) | 841 | 528 | 430 | 315 | 500 | 390 | 495 | 500 | 450 |

TABLE 5

|  | Ratio of Secondary Material/Primary Material | | | | | | | |
|---|---|---|---|---|---|---|---|---|
|  | 2/98 | | 18/82 | | | | | |
|  | Secondary Material A | Primary Material A | Secondary Material A | Primary Material A | Secondary Material A | Primary Material B | Secondary Material A | Primary Material C |
| Molecular weight Mw (×10$^5$) | 24 | 3.6 | 24 | 3.6 | 24 | 4.3 | 24 | 5.0 |
| Average particle diameter (μm) | 165 | 135 | 165 | 135 | 165 | 105 | 165 | 130 |
| Endothermic quantity in the range of 110 to 120° C. (δH (mH/g)) | 500 | | 565 | | 590 | | 545 | |

TABLE 6

|  | Ratio of Secondary Material/Primary Material | | | | | |
|---|---|---|---|---|---|---|
|  | 30/70 | | | | | |
|  | Secondary Material A | Primary Material A | Secondary Material A | Primary Material B | Secondary Material A | Primary Material C |
| Molecular weight Mw (×10$^5$) | 24 | 3.6 | 24 | 4.3 | 24 | 5.0 |
| Average particle diameter (μm) | 165 | 135 | 165 | 105 | 165 | 130 |
| Endothermic quantity in the range of 110 to 120° C. (δH (mH/g)) | 615 | | 620 | | 605 | |

|  | Ratio of Secondary Material/Primary Material | | | | | |
|---|---|---|---|---|---|---|
|  | 40/60 | | | | | |
|  | Secondary Material A | Primary Material A | Secondary Material A | Primary Material B | Secondary Material A | Primary Material C |
| Molecular weight Mw (×10$^5$) | 24 | 3.6 | 24 | 4.3 | 24 | 5.0 |

TABLE 6-continued

| | | | | | | |
|---|---|---|---|---|---|---|
| Average particle diameter (μm) | 165 | 135 | 165 | 105 | 165 | 130 |
| Endothermic quantity in the range of 110 to 120° C. (δH (mH/g)) | | 655 | | 655 | | 675 |

TABLE 7

| Ratio of Secondary Material/ Primary Material | Endothermic Quantity Ratio in the Range of 110 to 118° C. | | | | | | Endothermic Quantity Ratio in the Range of 110 to 120° C. | | | |
|---|---|---|---|---|---|---|---|---|---|---|
| | Secondary Material A | Secondary Material B | Secondary Material C | Secondary Material D | Secondary Material E | Secondary Material F | 2/98 | 18/82 | 30/70 | 40/60 |
| Primary Material A | 1.70 | 1.07 | 0.87 | 0.64 | 1.0 | 0.8 | 1.0 | 1.1 | 1.2 | 1.3 |
| Primary Material B | 1.68 | 1.06 | 0.86 | 0.63 | 1.0 | 0.8 | — | 1.2 | 1.2 | 1.3 |
| Primary Material C | 1.87 | 1.17 | 0.96 | 0.70 | 1.1 | 0.9 | — | 1.2 | 1.3 | 1.5 |

The invention claimed is:

1. A method of producing a microporous membrane comprising:
   1) melt-kneading a) a primary material comprising a high density polyethylene having an average particle diameter of 105 μm or more and having a molecular weight (Mw) of less than $1.0 \times 10^6$, b) a secondary material comprising an ultrahigh molecular weight polyethylene having an average particle diameter of 90 μm or more and having a molecular weight of $1.0 \times 10^6$ or more and less than $4.0 \times 10^6$, and c) a plasticizer, wherein the plasticizer is added in two or more places during melt-kneading and 50 to 95 wt % of the plasticizer is added at an upstream side of the melt-kneading;
   2) extruding the molten mixture obtained in step 1) through a spinneret to mold into a sheet shape;
   3) stretching the sheet obtained in step 2) by a sequential stretching method including a roll system or a tenter system; and
   4) extracting the plasticizer from the stretched film obtained in step 3) to produce a polyolefin microporous membrane,
   wherein, when an endothermic quantity of a mixture of the primary material and the plasticizer and an endothermic quantity of a mixture of the secondary material and the plasticizer are denoted as Q1 and Q2, respectively, a ratio of the endothermic quantity Q2 to the endothermic quantity Q1, (endothermic quantity Q2/endothermic quantity Q1), is 1 or more over a temperature range of 110 to 118° C.,
   a ratio of the average particle diameter of the primary material to the average particle diameter of the secondary material is 0.3 to 1.5,
   a proportion of the ultrahigh molecular weight polyethylene to the primary and secondary materials is 6 mass % or more, and
   a content of the primary and secondary materials is 10 to 50 wt % based on the weight of the primary and secondary materials and the plasticizer.

2. The method according to claim 1, wherein, when an endothermic quantity of a mixture of the primary material, the secondary material and the plasticizer is denoted as Q3, a mixing ratio of the primary material and the secondary material is set such that a ratio of the endothermic quantity Q3 to the endothermic quantity Q1, (endothermic quantity Q3/endothermic quantity Q1), becomes 1.1 or more over a temperature range from 110 to 120° C.

3. The method according to claim 1, wherein step 3) is performed by a roll system using a stretching apparatus including one or more preheating rolls, one or more stretching rolls, and one or more cooling rolls,
   a preheating time using the preheating roll is 1 to 500 seconds,
   a stretch ratio in one stretching section using the stretching roll is 1.01 to 6.0 times, and
   a strain rate in the stretching section is a rate of 5 to 450%/sec.

4. The method according to claim 1, wherein the primary material and the secondary material each have an average particle diameter of 80 μm to 250 μm.

5. The method according to claim 1, wherein a kneading temperature in step 1) is 140 to 250° C.

6. The method according to claim 1,
   wherein step 1) is performed using a twin-screw extruder having a screw, and
   a ratio Q/Ns of an extrusion quantity Q (kg/h) of a polyolefin solution as a mixture of the primary material, the secondary material and the plasticizer to a screw rotational speed (Ns) of the twin-screw extruder is 0.01 kg/h/rpm to 2.5 kg/h/rpm.

7. The method according to claim 1, wherein the average particle diameter of the primary material is 100 μm to 250 μm, and the average particle diameter of the secondary material is 90 μm to 250 μm.

8. The method according to claim 1, wherein step 3) is a step of stretching the sheet at a stretch ratio of 5 to 10 times in a length direction (MD) and at a stretch ratio of 5 to 9 times in a width direction (TD).

* * * * *